US009702156B2

(12) United States Patent
Urness et al.

(10) Patent No.: US 9,702,156 B2
(45) Date of Patent: Jul. 11, 2017

(54) HOT TUB COVER-INSULATION SYSTEM

(71) Applicants: Jeffrey Urness, Medical Lake, WA (US); Mark Hendricksen, Spokane, WA (US)

(72) Inventors: Jeffrey Urness, Medical Lake, WA (US); Mark Hendricksen, Spokane, WA (US)

( * ) Notice: Subject to any disclaimer, the term of this patent is extended or adjusted under 35 U.S.C. 154(b) by 102 days.

(21) Appl. No.: 14/559,090

(22) Filed: Dec. 3, 2014

(65) Prior Publication Data

US 2016/0160519 A1   Jun. 9, 2016

(51) Int. Cl.
| *E04H 4/08* | (2006.01) |
| *A61H 33/00* | (2006.01) |
| *F16L 59/02* | (2006.01) |
| *A61H 33/02* | (2006.01) |
| *A61H 33/06* | (2006.01) |
| *A61H 33/08* | (2006.01) |
| *A61H 37/00* | (2006.01) |

(52) U.S. Cl.
CPC .............. *E04H 4/084* (2013.01); *A61H 33/00* (2013.01); *A61H 33/6005* (2013.01); *F16L 59/026* (2013.01); *A61H 33/02* (2013.01); *A61H 33/06* (2013.01); *A61H 33/08* (2013.01); *A61H 37/00* (2013.01); *A61H 2201/0119* (2013.01); *A61H 2201/0126* (2013.01); *A61H 2201/169* (2013.01)

(58) Field of Classification Search
CPC ...................................... E04H 4/084
USPC ....................................... 4/488–513
See application file for complete search history.

(56) References Cited

U.S. PATENT DOCUMENTS

| 4,422,192 A | * | 12/1983 | Jacobs | E04H 4/08 4/496 |
| 4,853,985 A | * | 8/1989 | Perry | B65F 1/1623 16/287 |
| 5,022,101 A | * | 6/1991 | Gosselin | E04H 4/10 4/498 |
| 5,048,153 A | * | 9/1991 | Wall | E04H 4/084 16/223 |
| 5,086,525 A | * | 2/1992 | Christopher | E04H 4/08 4/498 |
| 5,131,102 A | * | 7/1992 | Salley | E04H 4/084 160/229.1 |
| 5,148,646 A | * | 9/1992 | Lutostanski | E04H 15/34 135/124 |
| 5,345,621 A | * | 9/1994 | Livingston | E04H 4/10 4/541.1 |
| 5,517,703 A | * | 5/1996 | Ouelette | E04H 4/084 4/498 |
| 5,566,403 A | * | 10/1996 | Black | E04H 4/084 220/264 |
| 5,619,759 A | * | 4/1997 | Hansen | E04H 4/10 4/498 |
| 5,802,630 A | * | 9/1998 | Hansen | E04H 4/08 4/498 |
| 5,819,332 A | * | 10/1998 | Perry | E04H 4/084 4/496 |

(Continued)

*Primary Examiner* — Lori Baker
(74) *Attorney, Agent, or Firm* — Wells St. John, P.S.

(57) ABSTRACT

A hot tub cover and insulation system wherein insulating blanket for use on the surface of the water in a hot tub is provided with a framework for attachment to the hot tub cover to allow it to be easily removed, stored and reinstalled when the hot tub cover is removed for use of the hot tub.

8 Claims, 20 Drawing Sheets

(56) References Cited

U.S. PATENT DOCUMENTS

| | | | | |
|---|---|---|---|---|
| 5,970,530 A * | 10/1999 | Hansen | E04H 4/08 | 4/496 |
| 5,974,599 A * | 11/1999 | Tudor | E04H 4/084 | 4/498 |
| 5,974,600 A * | 11/1999 | Pucci | E04H 4/084 | 4/498 |
| 6,000,072 A * | 12/1999 | LaHay | E04H 4/084 | 4/498 |
| 6,158,063 A * | 12/2000 | Tudor | E04H 4/084 | 16/280 |
| 6,381,766 B1 * | 5/2002 | Perry | E04H 4/084 | 16/239 |
| 7,155,756 B1 * | 1/2007 | Helder | E04H 4/084 | 4/498 |
| 8,578,524 B2 * | 11/2013 | Koren | E04H 4/084 | 4/494 |
| 2002/0040667 A1 * | 4/2002 | Birsel | A47B 21/00 | 108/25 |
| 2002/0050003 A1 * | 5/2002 | Perry | E04H 4/084 | 4/498 |
| 2003/0037370 A1 * | 2/2003 | Cato | E04H 4/08 | 4/498 |
| 2003/0150054 A1 * | 8/2003 | Tudor | E04H 4/084 | 4/498 |
| 2004/0143895 A1 * | 7/2004 | Loyd | E04H 4/084 | 4/498 |
| 2004/0154090 A1 * | 8/2004 | Perry | E04H 4/084 | 4/498 |
| 2005/0193484 A1 * | 9/2005 | Procida | E04H 4/08 | 4/498 |
| 2006/0010593 A1 * | 1/2006 | Stebner | E04H 4/08 | 4/498 |
| 2006/0053543 A1 * | 3/2006 | Vargas | E04H 4/084 | 4/498 |
| 2006/0225197 A1 * | 10/2006 | Koren | E04H 4/084 | 4/498 |
| 2006/0288473 A1 * | 12/2006 | Canty | E04H 4/106 | 4/498 |
| 2007/0079434 A1 * | 4/2007 | Pellerin | E04H 4/084 | 4/498 |
| 2007/0095608 A1 * | 5/2007 | Taylor | E06B 9/04 | 182/78 |
| 2007/0107118 A1 * | 5/2007 | Tudor | E04H 4/084 | 4/498 |
| 2007/0210290 A1 * | 9/2007 | Koren | E04H 4/084 | 254/264 |
| 2008/0244820 A1 * | 10/2008 | Moore | B63B 17/02 | 4/498 |
| 2009/0038068 A1 * | 2/2009 | Livingston | E04H 4/08 | 4/498 |
| 2010/0154110 A1 * | 6/2010 | Clermont | E04H 4/10 | 4/498 |
| 2010/0313352 A1 * | 12/2010 | Sloss | E04H 4/084 | 4/498 |
| 2011/0088157 A1 * | 4/2011 | Young | E04H 4/108 | 4/498 |
| 2011/0131722 A1 * | 6/2011 | Scott | A61H 33/00 | 4/584 |
| 2011/0239360 A1 * | 10/2011 | Gramatikopoulos | E04H 4/084 | 4/498 |
| 2012/0005818 A1 * | 1/2012 | Coelho | A61H 33/005 | 4/493 |
| 2012/0066828 A1 * | 3/2012 | Kite | E04H 4/084 | 4/498 |
| 2013/0031713 A1 * | 2/2013 | Kite | E04H 4/084 | 4/498 |
| 2013/0104307 A1 * | 5/2013 | Genova | A61H 33/60 | 4/498 |
| 2014/0090163 A1 * | 4/2014 | Genova | E04H 4/084 | 4/498 |
| 2014/0201898 A1 * | 7/2014 | Spicer | E04H 4/084 | 4/498 |
| 2014/0289954 A1 * | 10/2014 | Wyrick | E04H 4/084 | 4/498 |
| 2015/0020304 A1 * | 1/2015 | Rabon | E04H 4/08 | 4/498 |
| 2015/0047116 A1 * | 2/2015 | Brady | E04H 4/082 | 4/498 |
| 2015/0204094 A1 * | 7/2015 | Spicer | E04H 4/084 | 4/498 |
| 2015/0204095 A1 * | 7/2015 | Tournas | E04H 4/084 | 4/493 |
| 2015/0345163 A1 * | 12/2015 | Cunerty | E04H 4/084 | 4/498 |
| 2016/0053505 A1 * | 2/2016 | Dose | E04H 4/084 | 4/498 |
| 2016/0123028 A1 * | 5/2016 | Cunerty | E04H 4/084 | 4/498 |

* cited by examiner

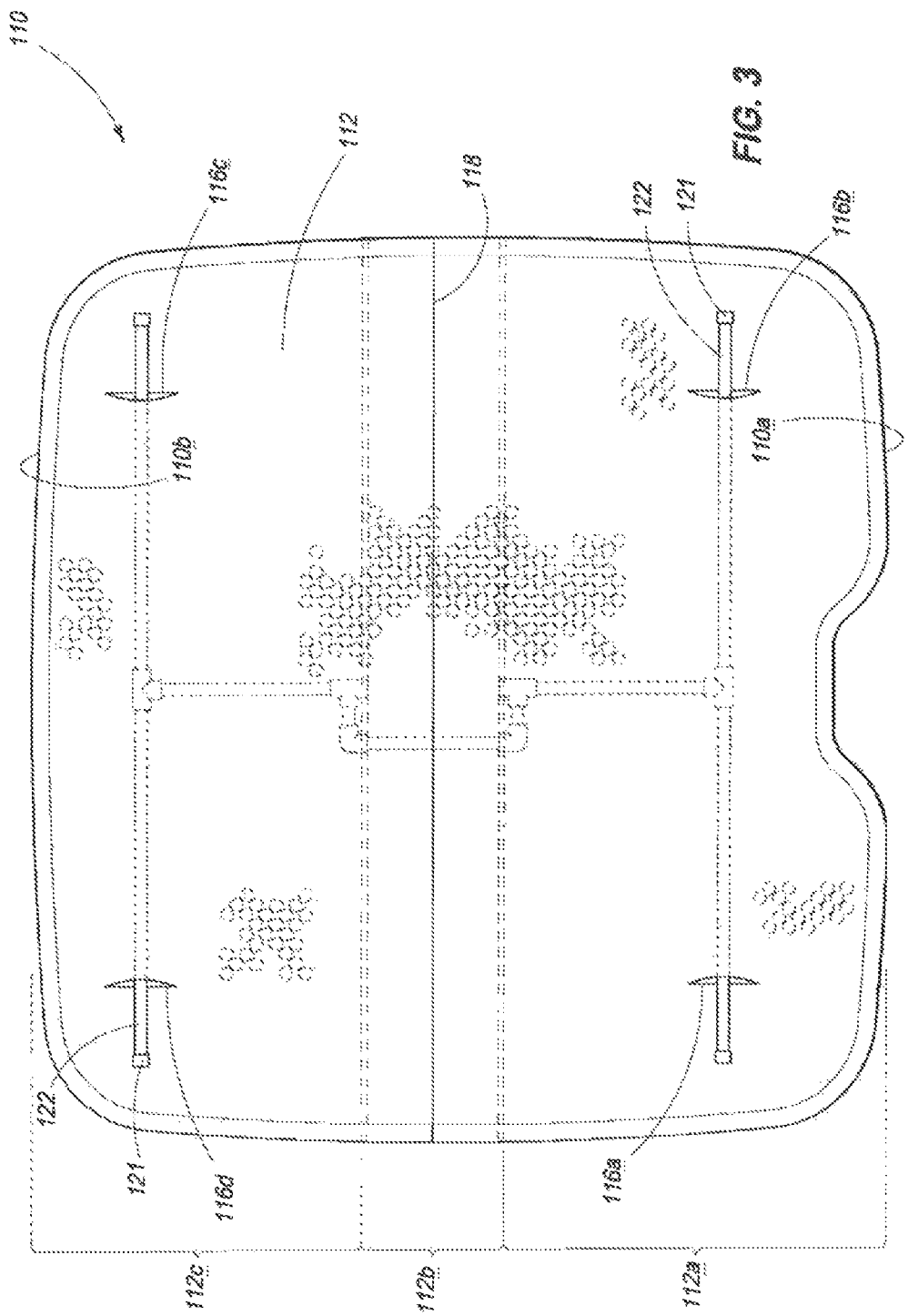

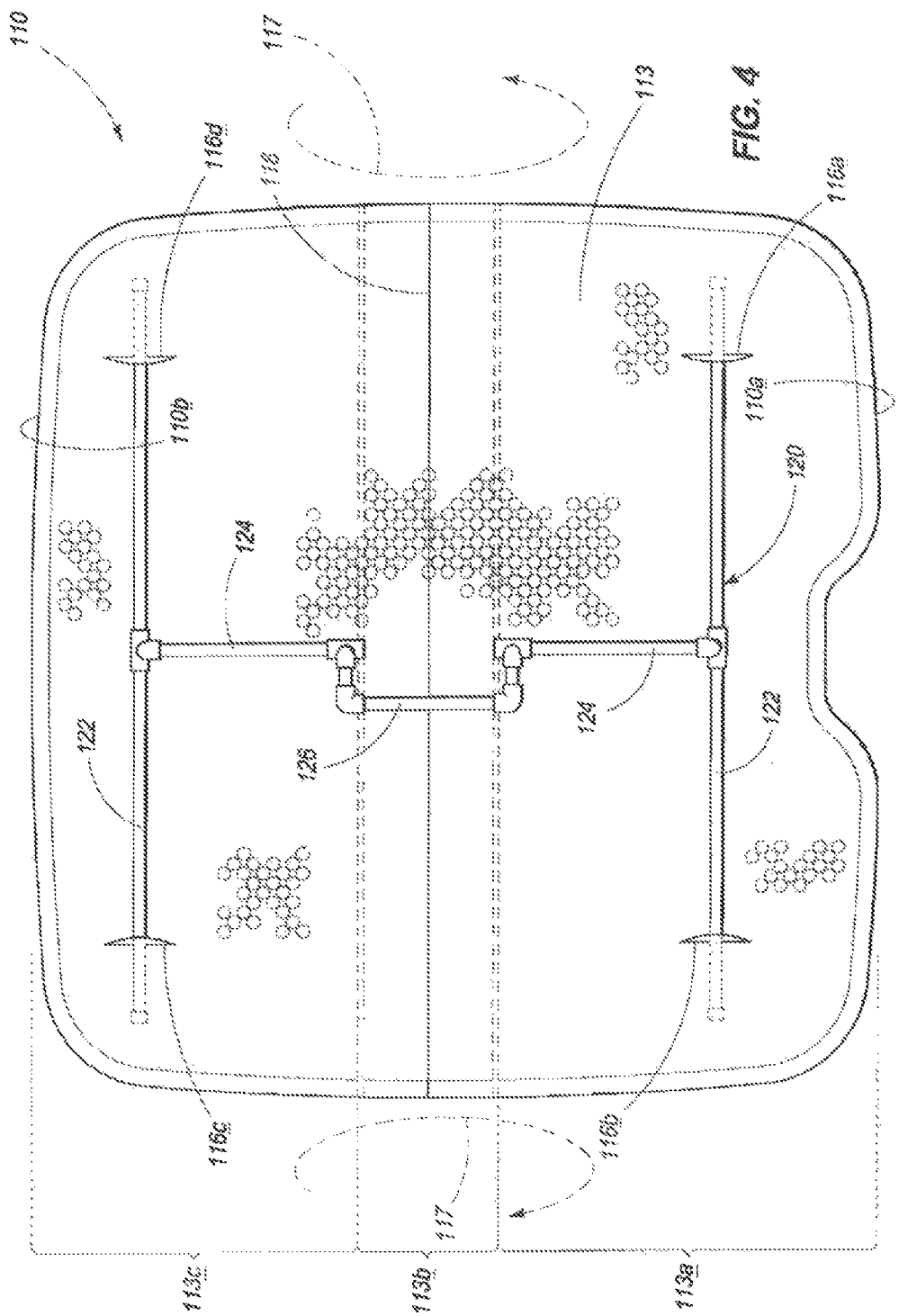

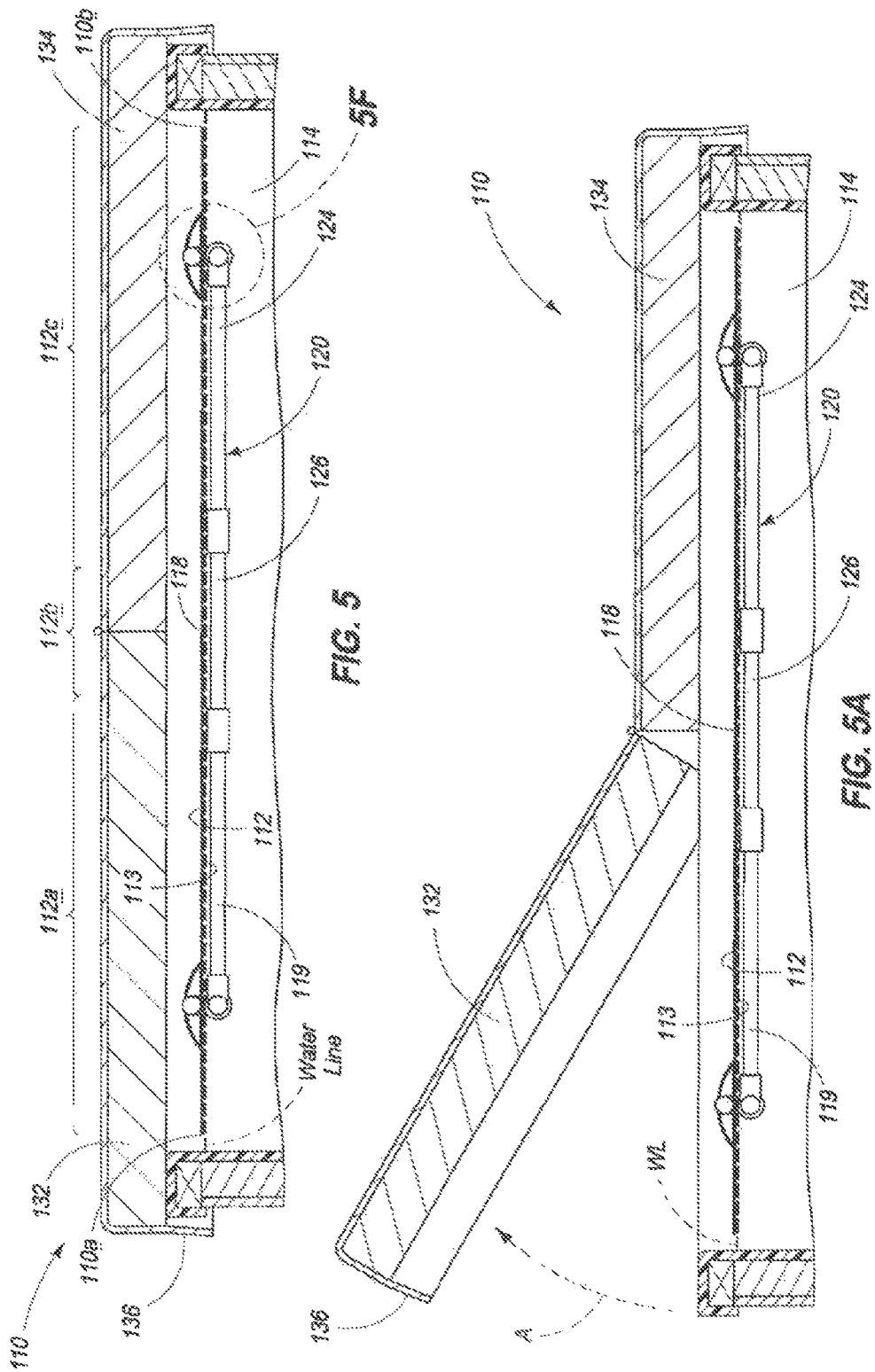

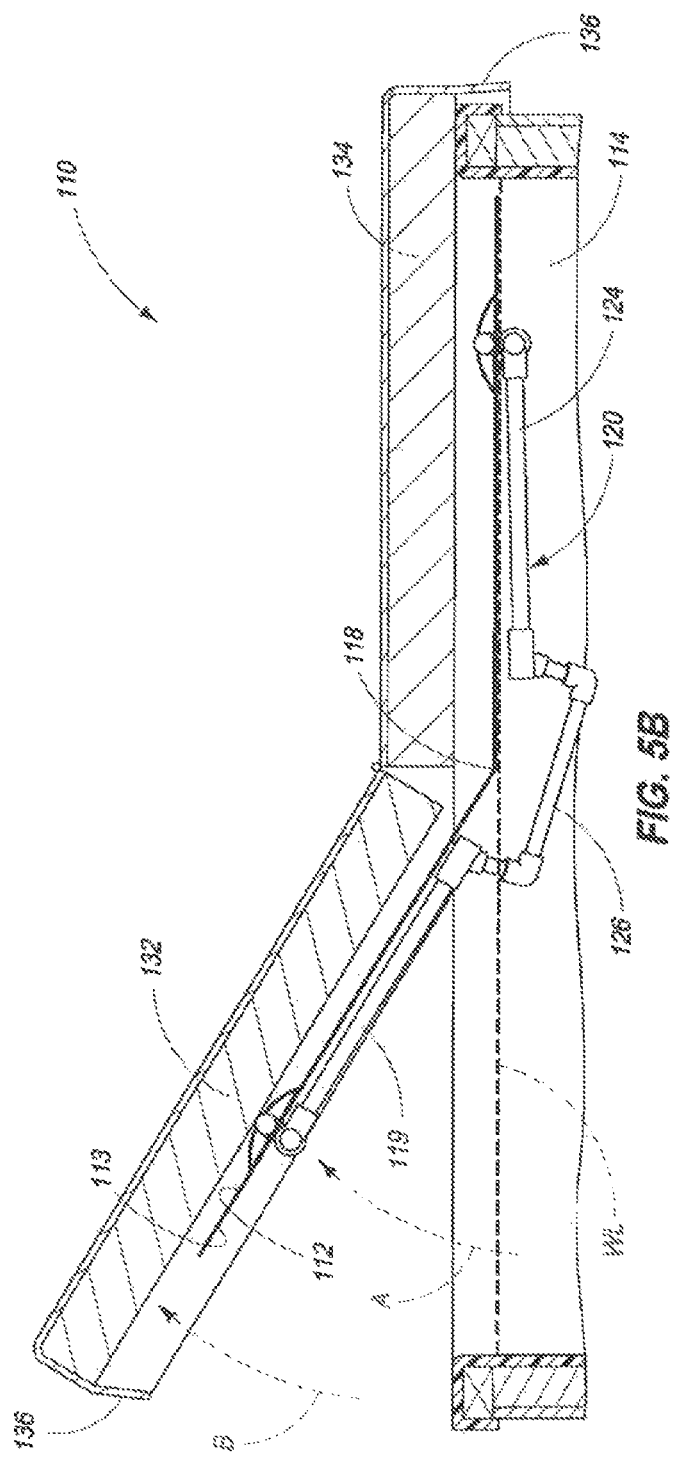

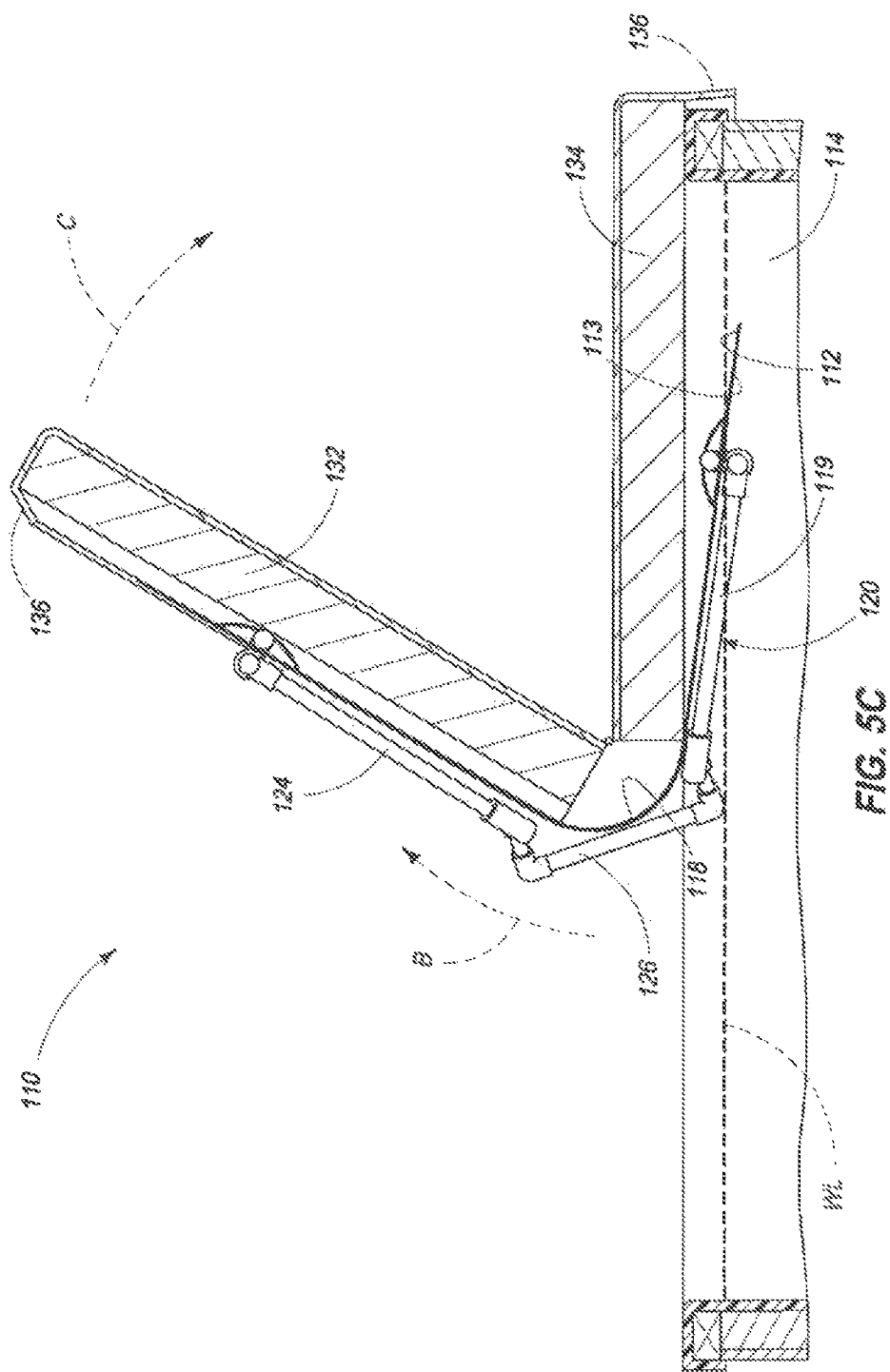

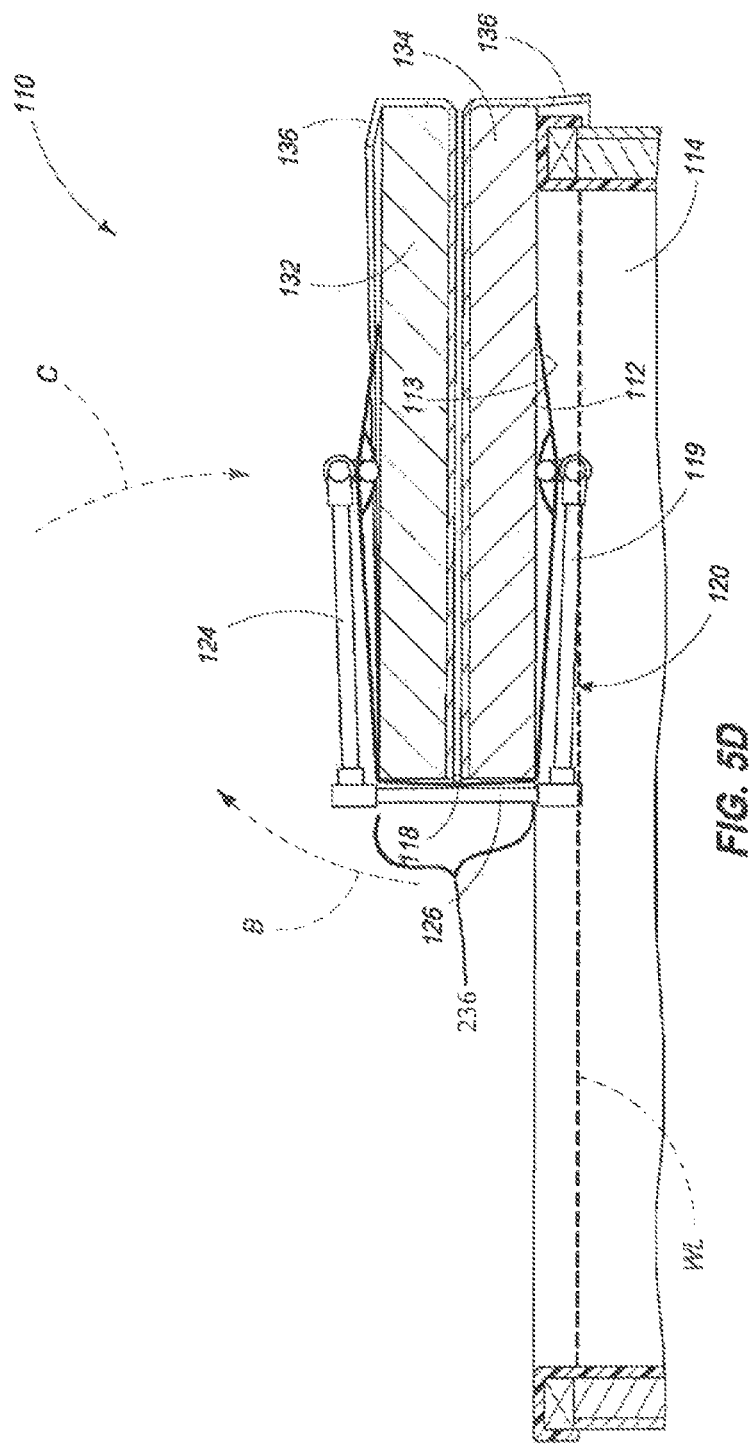

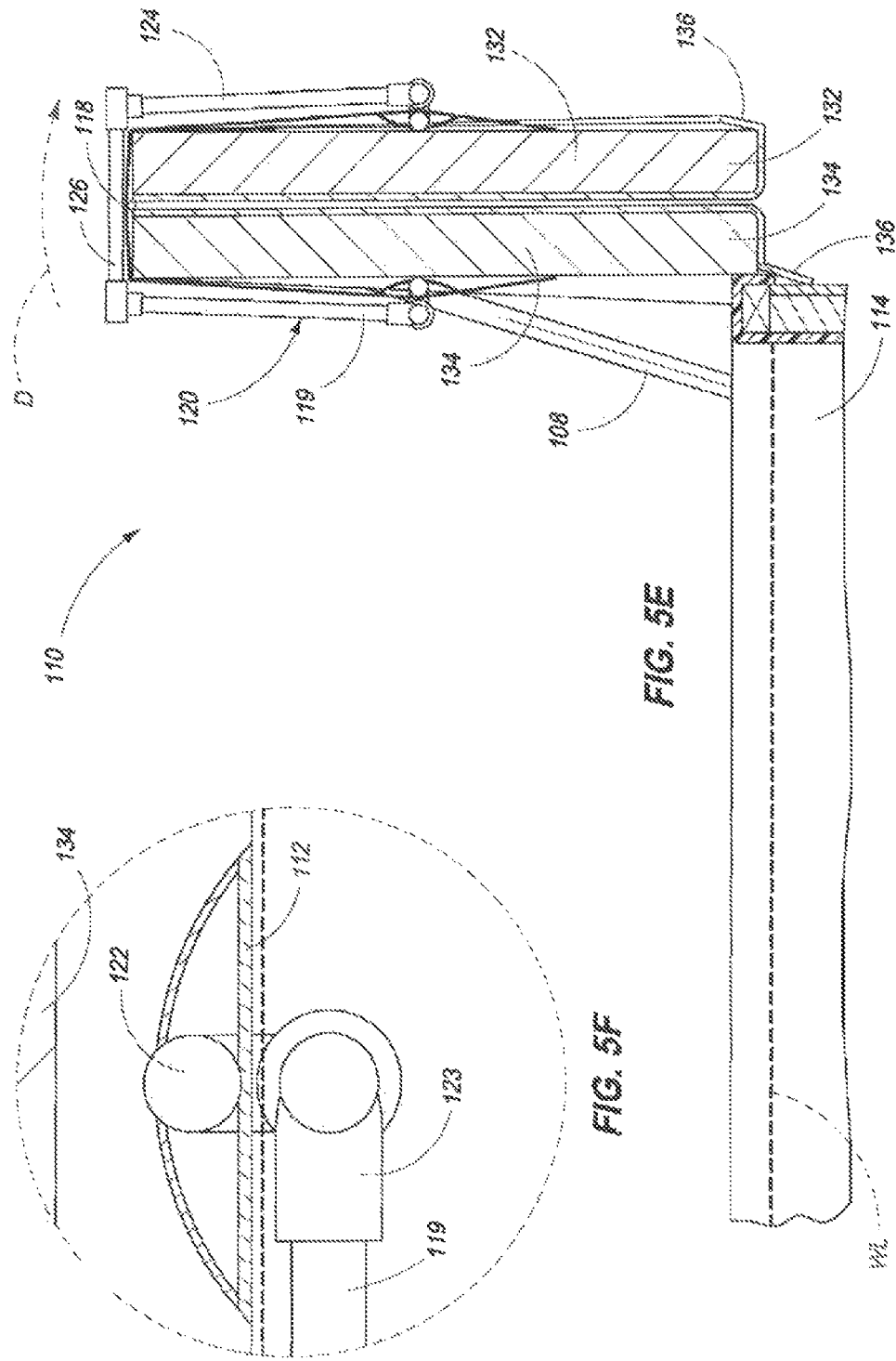

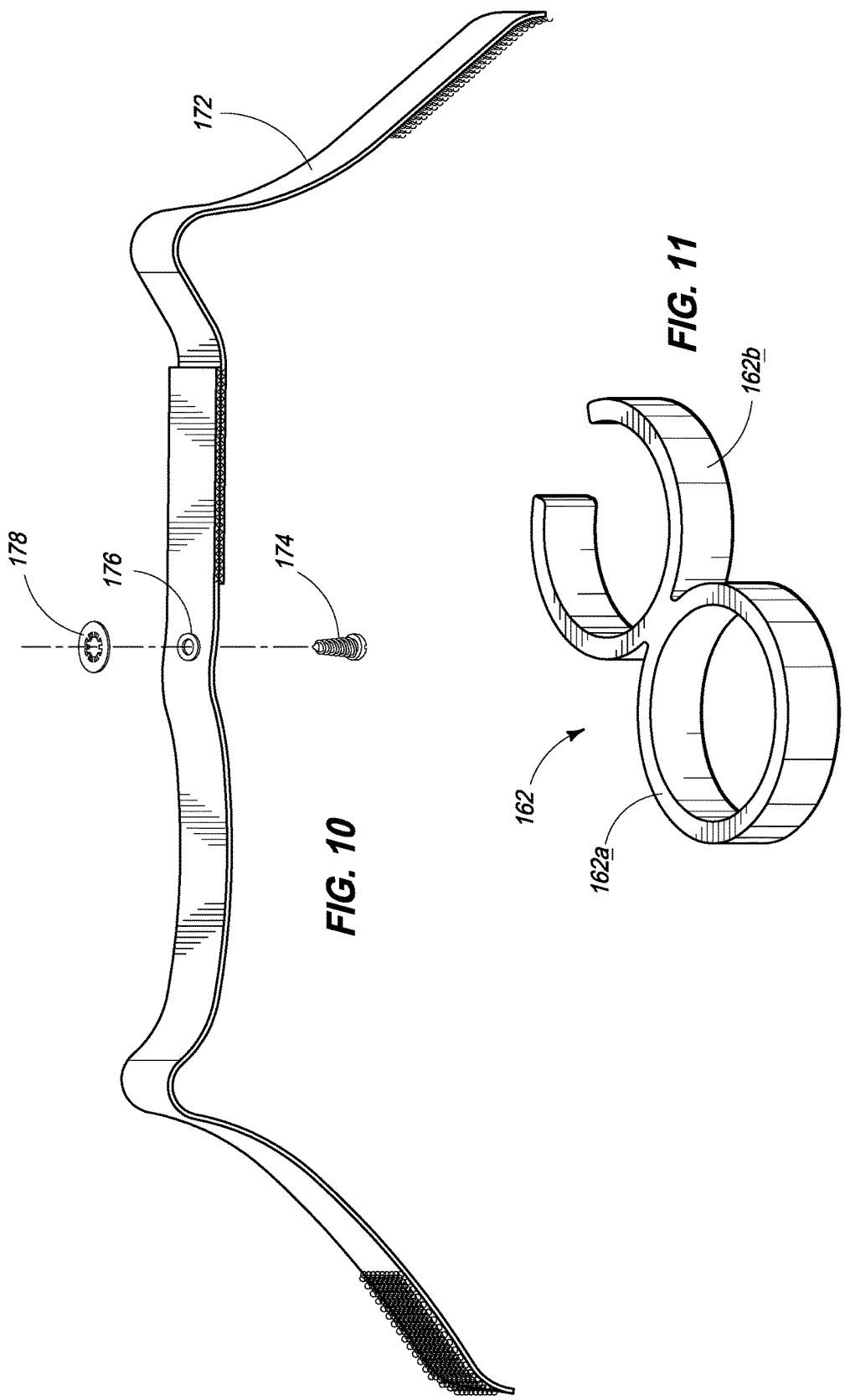

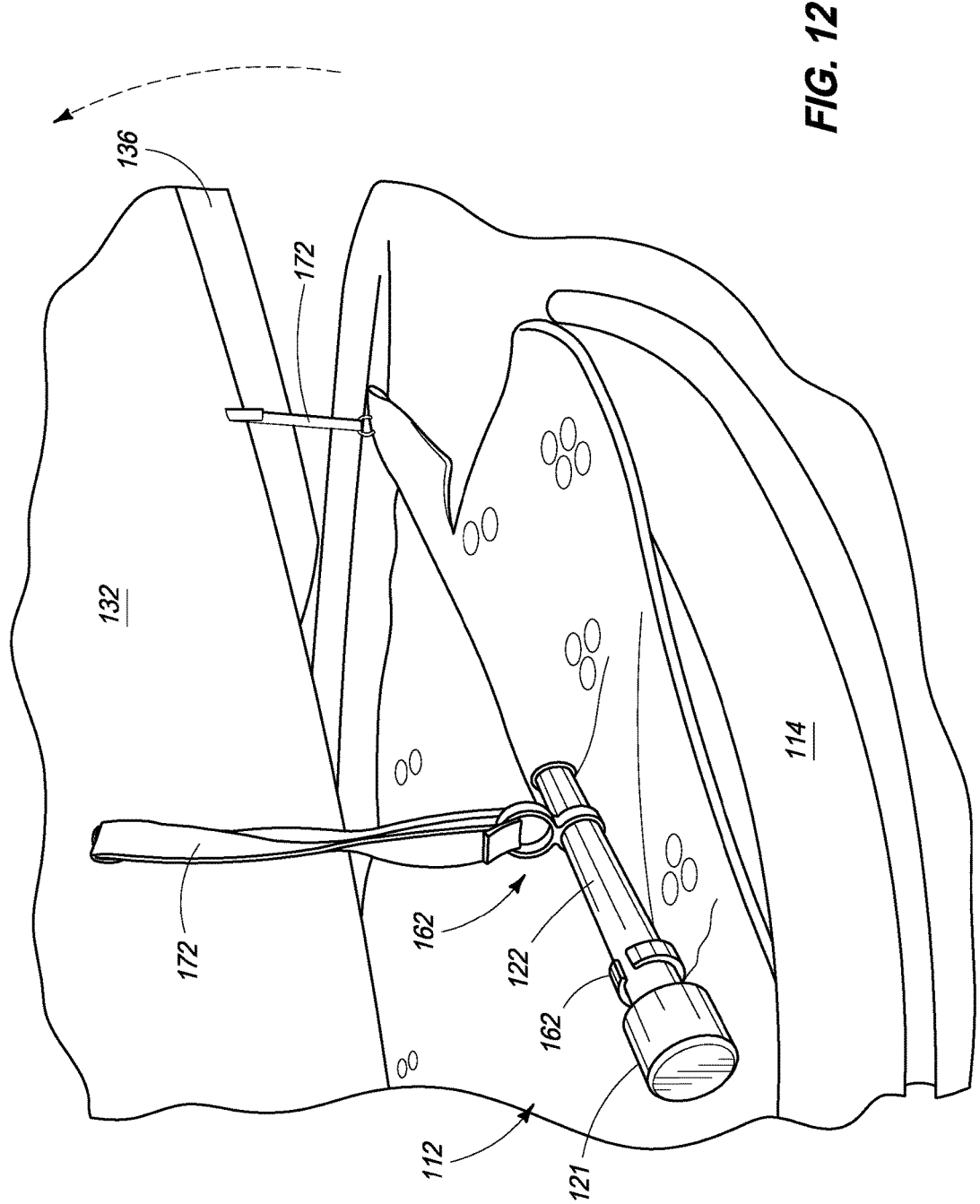

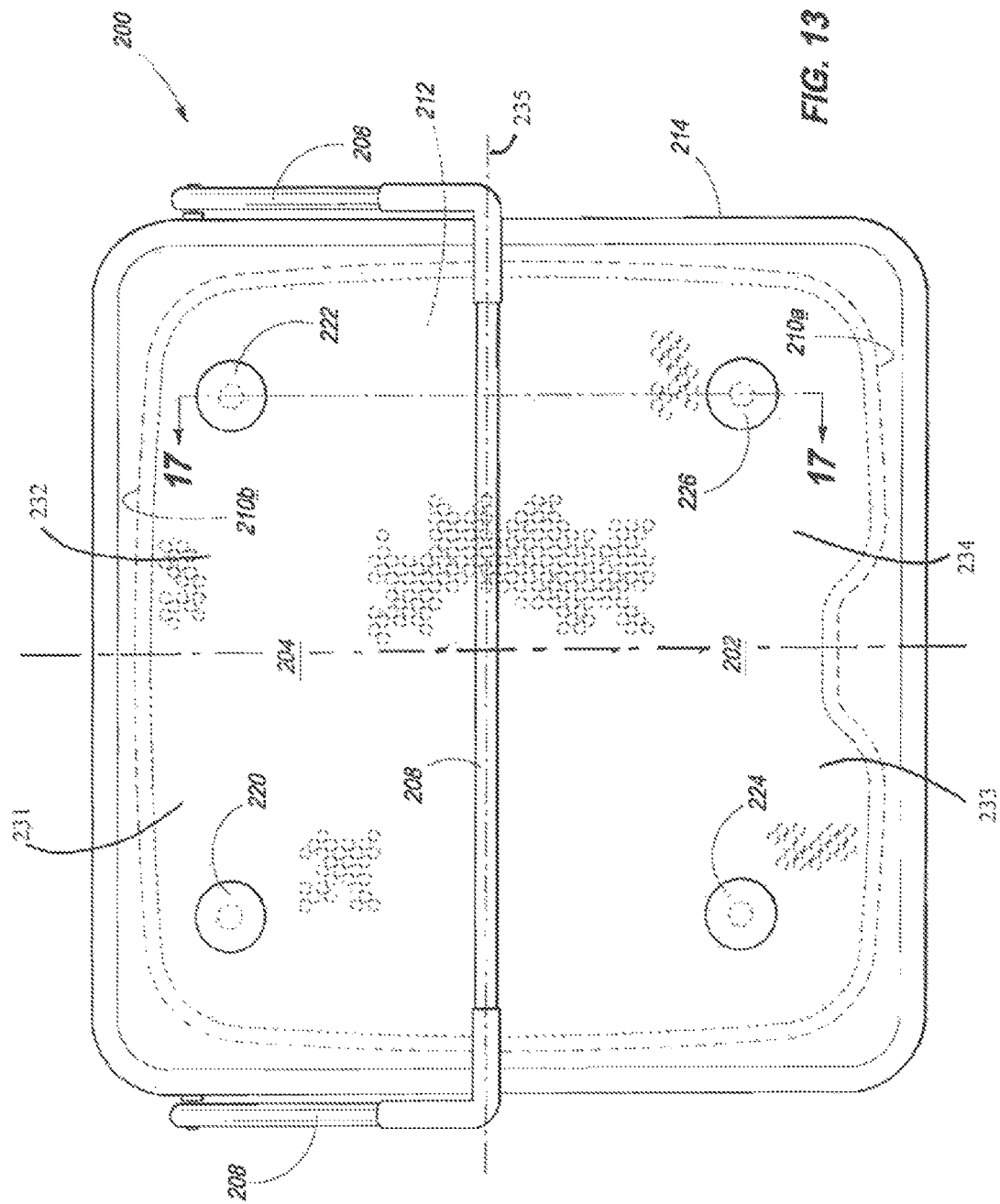

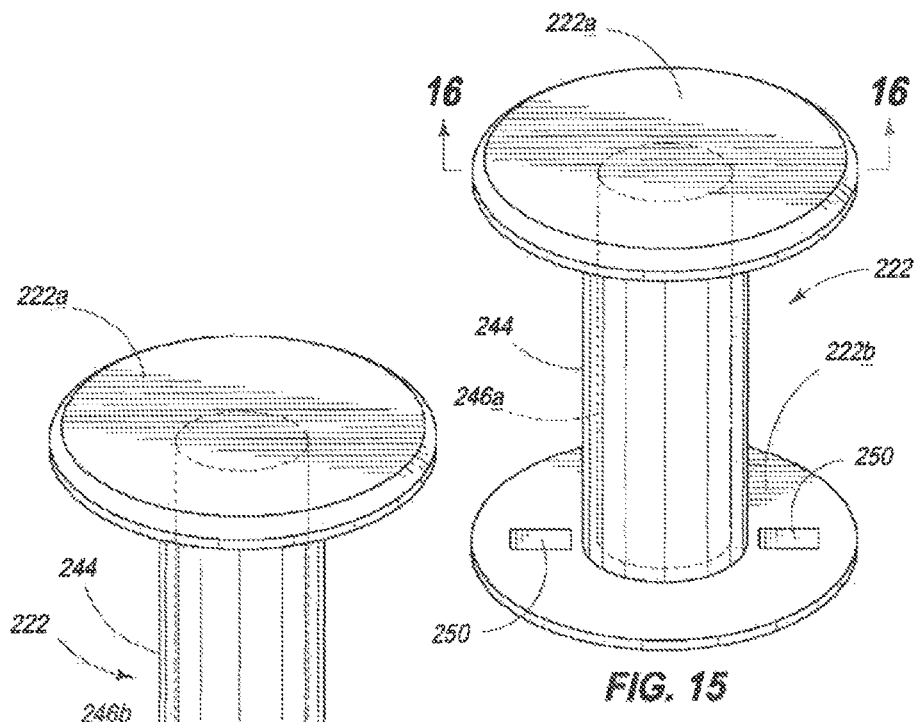
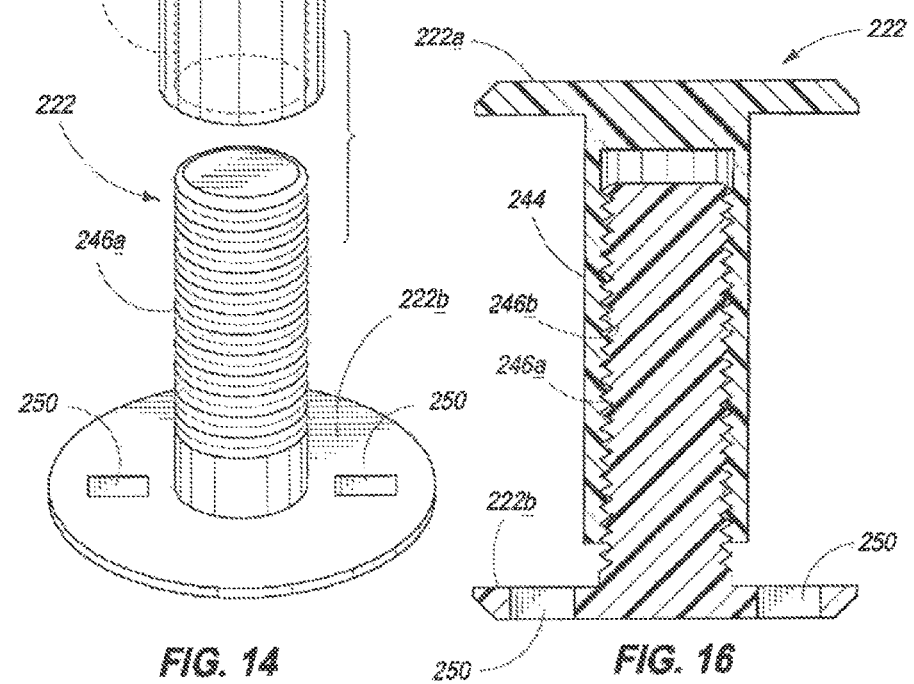
FIG. 14  FIG. 15  FIG. 16

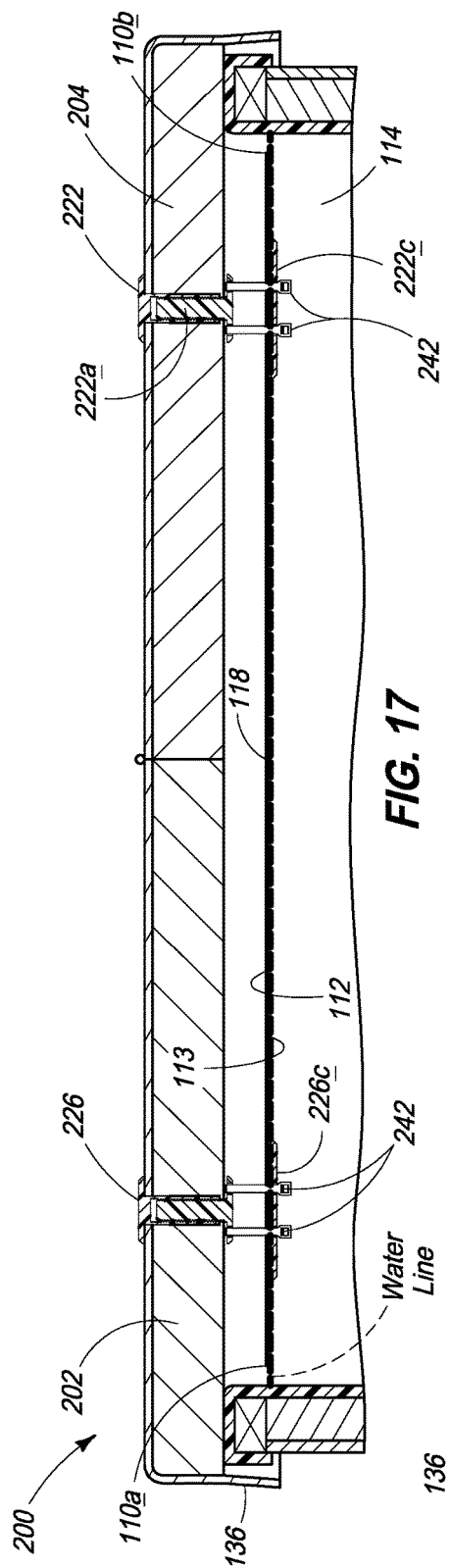
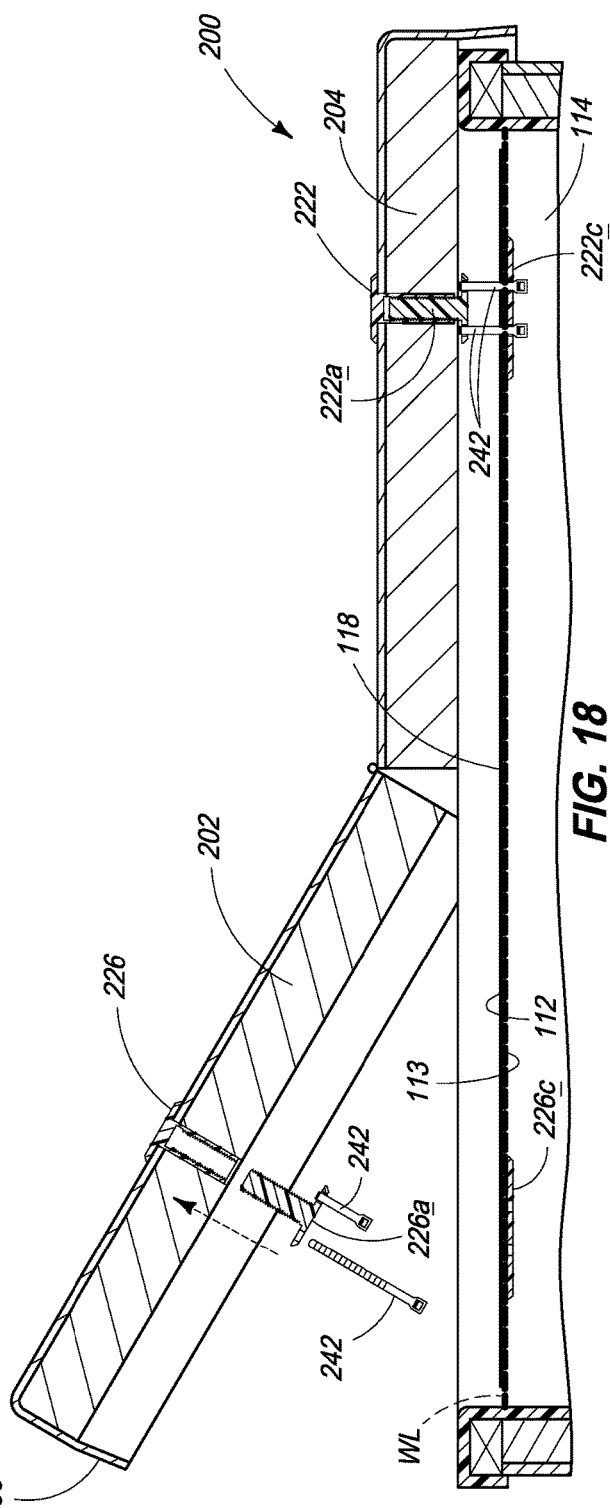
FIG. 17
FIG. 18

HOT TUB COVER-INSULATION SYSTEM

CROSS REFERENCE TO RELATED APPLICATION

This application does not claim priority from any other application.

TECHNICAL FIELD

This invention pertains to a hot tub, spa and/or soaking tub cover and insulation system, and more particularly to such a system which includes an internal insulating blanket conveniently operable concurrently or in combination with a hot tub cover.

BACKGROUND OF THE INVENTION

Spas, hot tubs and soaking tubs are a very popular way for people to relax, reduce stress and warm or heat their bodies. The various spas may or may not have internal water jets. Spas, hot tubs and soaking tubs are particularly popular and desirable in geographical areas where the temperatures get cold, such as below freezing.

In a typical hot tub the temperature can be set or directed to any one of a number of different temperatures, depending upon the desire or goals of the user of the hot tub, spa or soaking tub. A typical setting for a jetted hot tub in a colder climate would be an upper temperature of 103 to 104 degrees Fahrenheit.

A typical prior art hot tub cover is illustrated in FIG. 1 and FIG. 1A. FIG. 1 is an elevation perspective view of a prior art hot tub 101 with hot tub sides 106, illustrating a typical two-sided hot tub cover with first side 102 and second side 104 being shown. The hot tub cover lift arm 108 is generally pivotally fixed to the hot tub at a location below the cover and has a top bar portion 108*a* which is generally positioned across the middle of the hot tub cover so that either side of the hot tub cover can be pivoted around the top bar portion 108*a* (the pivoting illustrated by arrows 103 and 105) to open up half of the hot tub, or to continue by pivoting the lift arm 108 as shown in FIG. 1A (arrow 107) to allow the entire hot tub cover to be pivoted to the side and out of the way so the entire top portion of the hot tub 101 is accessible.

Although the typical hot tub covers have some insulation value, in many cases there is a need for the advantage of providing further insulation (such as an insulating blanket) to the heat within the water in the hot tub, spa or soaking tub, especially in colder climates. Such additional insulation will result in an energy savings and consequently economic savings to the user year-round as the user is typically attempting to insulate a mass (the body of water) to keep it at the desired temperature (generally 103° F. or 104° F.).

One way to provide the additional insulation is an insulating blanket that can be placed on the top surface of the water. These insulating blankets are generally known for placing on swimming pools and they would be made of a plastic like material and typically would have several encapsulated air compartments or bubbles which provide additional insulation and cause the blanket to float on the water line or surface of the water.

While in typical swimming pool applications these insulating blankets utilize large rollers to remove them from the surface and manage them when not covering the surface of the water. However this is not practical with a spa, hot tub or soaking tub. Some hot tub owners will custom cut an insulating blanket and place it on the surface of the water, but when they remove the hot tub cover they then must deal with pulling the blanket off and placing it somewhere out of the way while the hot tub is being accessed. This becomes very inconvenient.

It will be appreciated by those of ordinary skill in the art that there is a need for a hot tub insulation system which can minimize or eliminate the inconveniences of dealing with the use of insulation blankets in a hot tub scenario.

It is therefore an object of this invention to provide a spa, hot tub or soaking tub cover and insulation system which more easily removes, stores and reapplies an insulating blanket for use on the top surface of the water in the spa, hot tub or soaking tub.

Because it is not uncommon for users of the hot tub to only use half or less of the hot tub, and thereby only pivot one-half of the hot tub cover onto the other half to allow access, another object of this invention is to provide such an insulation blanket cover system which may be utilized in the two different hot tub cover configurations, i.e. when only half of the hot tub is being accessed and when the entire hot tub is being accessed and the entire cover has been removed.

It is also an object of some embodiments of this invention to provide such a system wherein the insulating blanket may be removed and reapplied independent from the hot tub cover or in other embodiments, the insulating blanket may be attached to or integrated with the hot tub cover, all contemplated by various embodiments of this invention.

Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Preferred embodiments of the invention are described below with reference to the following accompanying drawings.

FIG. 3 is a top view of an example of an insulating blanket utilized in combination with an example of an embodiment of this invention;

FIG. 4 is a bottom view of the example of the embodiment of the invention illustrated in FIG. 3;

FIG. 5 is a section elevation view of the example of the embodiment of the invention illustrated in FIG. 3, with blanket on the surface of water within the hot tub;

FIG. 5A is the same section elevation view of the example of the embodiment of the invention illustrated in FIG. 3, wherein one side of the hot tub cover has been partially pivoted upward;

FIG. 5B is the same section elevation view of the example of the embodiment of the invention illustrated in FIG. 3, wherein one side of the hot tub cover has been partially pivoted upward;

FIG. 5C is the same section elevation view of the example of the embodiment of the invention illustrated in FIG. 5B, wherein one side of the hot tub cover has been further pivoted upward;

FIG. 5D is the same section elevation view of the example of the embodiment of the invention illustrated in FIGS. 5B & 5C, wherein one side of the hot tub cover has been further pivoted to the one-half open position;

FIG. 5E is the same section elevation view of the example of the embodiment of the invention illustrated in FIGS. 5B & 5C, wherein both sides of the hot tub cover have been further pivoted to the fully open position;

FIG. 5F is an elevation detail view of an attachment of the framework 119 to the insulating blanket;

FIG. 10 is a perspective view of an embodiment of a connector or strap which may be utilized in embodiments of this invention to operably attach an insulating blanket to the hot tub cover;

FIG. 11 is a perspective view of an example of an adapter utilized in embodiments of this invention to attach an insulating blanket to the hot tub cover;

FIG. 12 is an elevation perspective view of an example of an embodiment of this invention wherein the strap illustrated in FIG. 10 is attached to the hot tub cover on one end and to the adapter illustrated in FIG. 11 at the other end, to operably connect the framework which supports the insulating blanket to the hot tub cover;

FIG. 13 is a top view of another example of an embodiment of the invention, wherein the insulating blanket is attached to the hot tub cover without interconnecting framework between the points of attachment;

FIG. 14 is a perspective exploded view of a hot tub attachment member which provides a point of attachment for attaching an insulating blanket to the hot tub cover;

FIG. 15 is a perspective of the hot tub attachment member illustrated in FIG. 14 with the two pieces fastened together;

FIG. 16 is a cross-section view 16-16 from FIG. 15;

FIG. 17 is an elevation view of another example of an embodiment of this invention wherein hot tub attachment members illustrated in FIGS. 14-16 are utilized to connect the insulating blanket to the hot tub cover.

FIG. 18 is an elevation view of the example of the embodiment of the invention illustrated in FIG. 17, wherein the first side of the hot tub cover is partially rotated or pivoted relative to the second side of the hot tub cover;

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

Figure 1A:
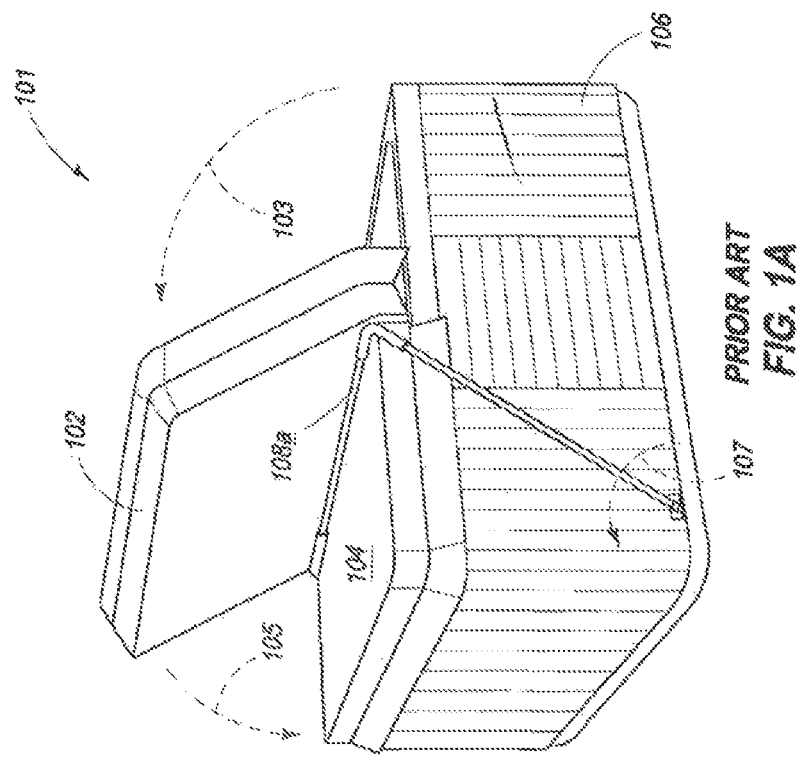
FIG. 1A is an elevation perspective view of the prior art hot tub illustrated in FIG. 1, with one side of the two-part cover partially pivoted around the top portion of the cover lift bar.
Figure 1:
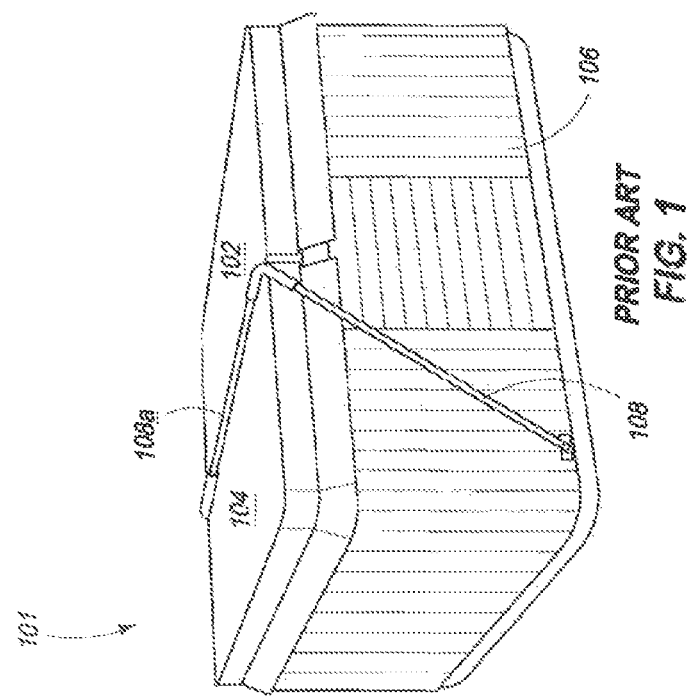
FIG. 1 is an elevation perspective view of a typical prior art hot tub with a two-part hot tub cover.

FIG. 1 and FIG. 1A are identified and described in the background section above as prior art, and will not be further discussed in detail here.

Figure 2:
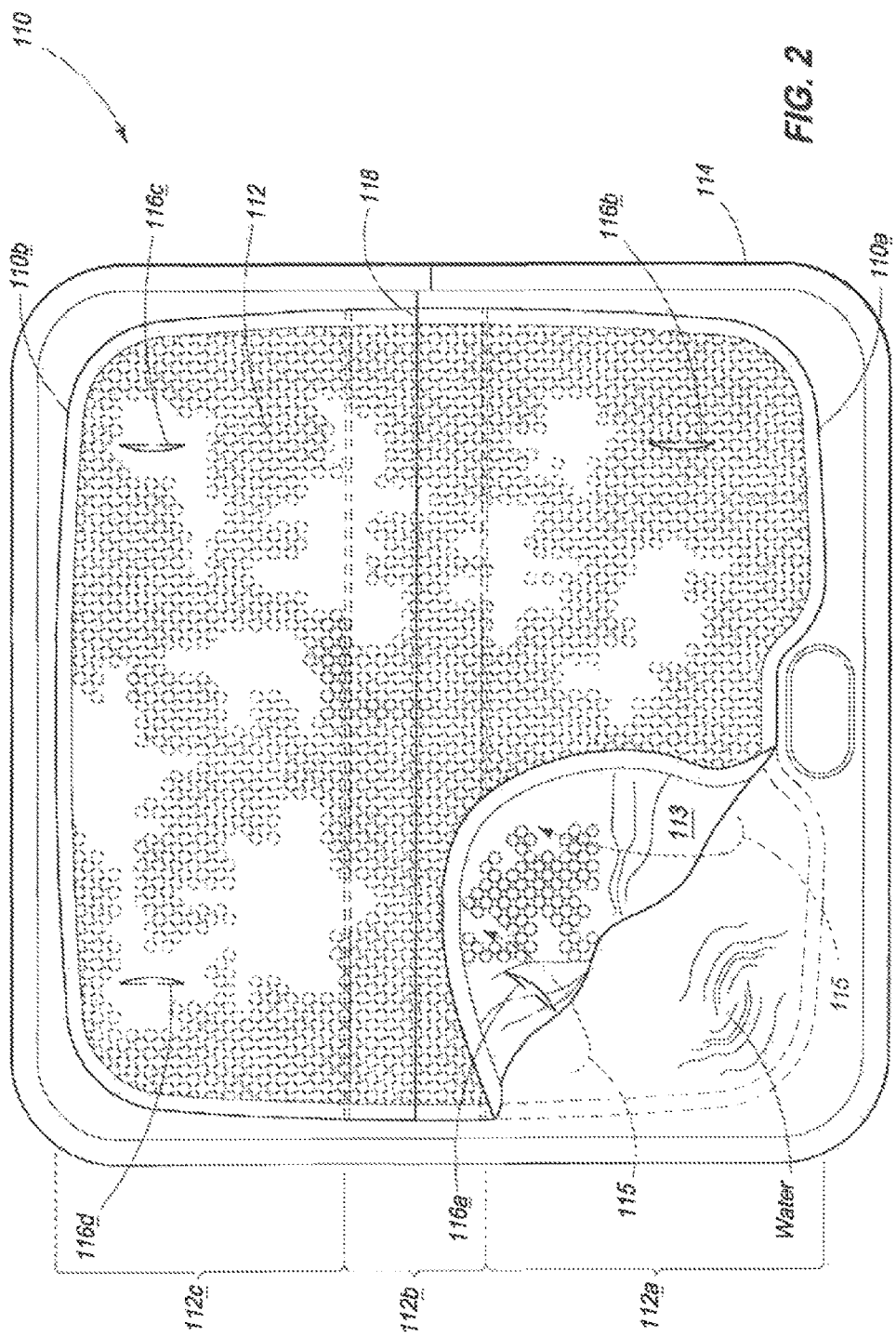
FIG. 2 is a top view of an exemplary hot tub with a custom sized insulating blanket which may be utilized with embodiments of this invention, shown on the surface of the water, with one corner of the insulating blanket pulled back for illustrative purposes.

FIG. 2 is a top view of an exemplary hot tub, spa or soaking tub 114, with a custom sized insulating blanket 112 which may be utilized with embodiments of a system 110 contemplated by this invention, shown on the surface of the water, with one corner of the insulating blanket pulled back (as indicated by arrows 115) for illustrative purposes, exposing bottom surface 113 of insulating blanket 112. FIG. 2 illustrates the insulating blanket 112 with an approximate centerline 118 and framework apertures 116a, 116b, 116c and 116d. The framework apertures 116a, 116b, 116c and 116d in the insulating blanket 112 provide a means to place the framework through the apertures and points of attachment, one on each approximate quadrant of the insulating blanket 112, as shown more fully in FIG. 3 and FIG. 4.

FIG. 2 further illustrates the insulating blanket being segmented into portions for discussion illustration purposes, with a first portion 112a, a middle portion 112b and a second portion 112c. The middle portion 112b corresponds to the ends of the respective sides of the hot tub cover when the first side of the hot tub cover is folded or pivoted over on top of or adjacent to the second side of the hot tub cover.

It should be noted that while the term insulating blanket is used herein and the primary example given and shown is a plastic bubble type insulating blanket, this invention is not limited to any one in particular type of insulation layer, but instead any one of a number of different types of insulation layers, blankets, and other materials may be utilized all within the contemplation of this invention and all is intended to be included within the definition of the phrase "insulating blanket" which is used to describe a certain level of insulative covering of the water line or surface of the water within the hot tub, spa or soaking tub. Furthermore, though a one-piece insulating blanket is primarily shown and described herein, this invention is not so limited and the insulating blanket may be in multiple pieces attached together or attached to the hot tub cover, all within the contemplation of this invention.

FIG. 3 is a top view of an example of one embodiment of this invention, showing an insulating blanket 112 utilized in combination with a framework, wherein the insulating blanket 112 includes framework apertures 116a, 116b, 116c and 116d. FIG. 3 further illustrates framework 122 with framework end-piece 121 as well as illustrating a first portion 112a, a middle portion 112b and a second portion 112c of insulating blanket 112. FIG. 3 further illustrates a first side 110a and a second side 110b of the insulating blanket, the size would correspond to the internal sides of the spa, hot tub or soaking tub.

It should be noted that the insulating blankets to go on the surface of the water within the spa, hot tub or soaking tub, may be made of very flexible plastic or solar blanket type material. Due to the size of some hot tubs the size of these insulating blankets can be quite large and a certain minimum preferred amount of surface area may be required in a lifting interface or framework to allow the easy removal of the insulating blankets from the water without damage to the insulating blanket. The force required for the removal would be that necessary to lift the weight of the insulating blanket and break the surface tension of the water when removing it. It is therefore preferred, though not required, to assure that any framework has a sufficient amount of surface area of the support or framework under a sufficient amount of insulating blanket to avoid tearing or otherwise damaging the insulating blanket. In the example of the embodiment illustrated in FIG. 3, the framework in this embodiment includes bars or framework portions that support the four different quadrants of the insulating blanket with sufficient surface area to assure there is no ripping and there is easy management of that blanket when the hot tub cover is being pivoted.

FIG. 4 is a bottom view of the example of the embodiment of the invention 110 illustrated in FIG. 3, showing framework 120 with support bars 122, center framework component 126 and connector framework components 124, which connect the center framework component 126 to the respective support members 122. FIG. 4 further illustrates different portions of the insulating blanket similar to prior figures which identify or illustrate a first side or portion 113a, a middle portion 113b and a second side or portion 113c.

FIG. 4 further illustrates framework apertures 116a, 116b, 116c and 116d in the insulating blanket through which portions of the framework are respectively inserted or placed, with arrows 117 illustrating how first side 110a of the insulating blanket 113 is pivoted relative to the approximate centerline or axis 118 relative to the second side 110b of the insulating blanket.

FIG. 5 is a section elevation view of the example of the embodiment of the invention 110 illustrated in FIG. 3, with insulating blanket 112 on the surface of the water, or the water line within the hot tub, first side of hot tub cover 132 and second side of hot tub cover 134 with end cover portion 136 of hot tub cover, first side 110a of insulating blanket 112 and second side 110b of insulating blanket 112, connecting members 119 & 124 of framework 120. FIG. 5 illustrates a first portion 112a, a middle portion 112b and a second portion 112c, of the insulating blanket 112, and a first side 132 and second side 134 of hot tub cover wherein the first side 132 is pivotally connected to the second side 134. FIG. 5 also shows a first side 110a and a second side 110b of insulating blanket 110, framework 120 with first side connecting member 119 and second side connecting member 124, as well as a center framework component 126.

FIG. 5 illustrates an example of an embodiment of the invention 110 wherein the insulating blanket 112 is not connected to the hot tub cover while the insulating blanket 112 is floating on the surface of the water or the water line. As shown in FIG. 5A through FIG. 5E, the insulating blanket and framework could and would be manually moved in the position shown as the hot tub cover is moved in the position shown in FIG. 5A through FIG. 5E, as is more fully described below. It should be noted and is described below that in other embodiments the insulating blanket and framework may be operably attached to the hot tub cover so that little or no manual intervention is needed by the user for the insulating blanket and framework to pivot together, all contemplated by various embodiments of this invention.

FIG. 5A is the same section elevation view of the example of the embodiment of the invention 110 illustrated in FIGS. 3 & 4, wherein a first side 132 of the hot tub cover has been partially pivoted upward as shown by arrow A. Similarly or like numbered items in FIG. 5A are shown and described above in reference to FIG. 5 and will not be repeated herein.

In some aspects or embodiments of this invention, the framework is operably attached to the insulating blanket 112 separate from the hot tub cover so that it may be manually moved with the hot tub cover as the hot tub cover is pivoted to the half-open or fully open positions. What this allows the user to do is independently remove the insulating blanket and framework combination and then place it on top of the fully removed hot tub cover (or store it elsewhere if desired), or alternatively, manually move one-half of the insulating blanket and framework if the hot tub cover is only open to its one-half open position wherein one side of the hot tub cover is pivoted to rest on the other side. In that situation, the framework and insulating blanket on the same side as the pivoted side of the hot tub cover can be manually pivoted and placed on top of the hot tub cover, such as illustrated in FIG. 5D.

In other embodiments of the invention the framework and insulating blanket combination may be attached to the hot tub cover and thereby automatically or concurrently rotated or pivoted with the hot tub cover, but with its own separate framework as shown in later figures.

In yet another embodiment of the invention, the insulating blanket may be more directly attached to the hot tub cover, preferably in all four quadrants, and thereby pivoting or moving when the hot tub cover is moved. In this situation, the attachments to the hot tub cover and insulating blanket provides the required structure to support the insulating blanket on the bottom side of the insulating blanket, and move it with and when the hot tub cover is moved. In this embodiment of the invention due to the nature of typical insulating blankets, and to avoid tearing or damaging the insulating blankets when they are moved, it is generally preferred that there be a minimum surface area support beneath the insulating blanket so that it is not lifted from a single or small area or point of contact on the insulating blanket. This will minimize the chances that the blanket will tear or deform during lifting.

FIG. 5B illustrates a continuation of the movement initiated in FIG. 5A wherein one side of the hot tub cover has been partially pivoted upward (arrow B), and further wherein the first side of the framework 119 is also moved in combination with the first side 132 of the hot tub cover. In some embodiments of the invention the movement of the combination of the first side 119 of the framework with the first side of the hot tub cover 132 can be through the manual movement by the user. In other embodiments of this invention and as described more fully elsewhere herein, the two may be connected or integrated in some way such that movement of the first side 132 of the hot tub cover causes correlating movement of first side 119 of the insulating blanket, which would also move the first portion of the insulating blanket with the first side 119 of the framework.

Similarly or like numbered items in FIG. 5B are shown and described above in reference to FIG. 5 and FIG. 5A, and will not be repeated herein.

FIG. 5C is the same section elevation view of the example of the embodiment of the invention illustrated in FIG. 5B, only wherein one side of the hot tub cover has been further pivoted (arrows B & C) upward. Similarly or like numbered items in FIG. 5B are shown and described above in reference to FIG. 5, FIG. 5A and FIG. 5 B, and will not be repeated herein. FIG. 5C illustrates how center the framework component 126 serves to straddle the double end of the two sides of the hot tub cover to allow each of the end portions of the insulating blanket to move with the two sides of the hot tub cover. FIG. 5C further shows how center framework component 126 of the framework pivots relative to end portions 119 and framework 120 to enable the desired movement of the insulation blanket with the hot tub cover as illustrated and desired.

FIG. 5D is the same section elevation view of the example of the embodiment of the invention illustrated in FIGS. 5B & 5C, wherein the first side 132 of the hot tub cover has been further pivoted to the one-half open position so it is placed on the second side 134 of the hot tub cover. Similarly or like numbered items in FIG. 5B are shown and described above in reference to FIG. 5 through FIG. 5C, and will not be repeated herein. FIG. 5D further shows how the framework may pivot in two pivot locations or along two pivot axis, to correspond to the width 236 of the first and second sides of the hot tub cover. It should be noted that the framework may include a flexible or semi-flexible section to provide for the pivoting in the framework, all within the contemplation of embodiments of this invention.

FIG. 5E is the same section elevation view of the example of the embodiment of the invention illustrated in FIGS. 5B & 5C, wherein both sides of the hot tub cover have been further pivoted on the hot tub cover lift arm 108 to the fully open position.

FIG. 5F is an elevation detail view of an attachment of the connecting member 119 of the framework to an insulating blanket 112, illustrating support member 122 of the framework and framework joint 123 or connector joint.

Figure 6:
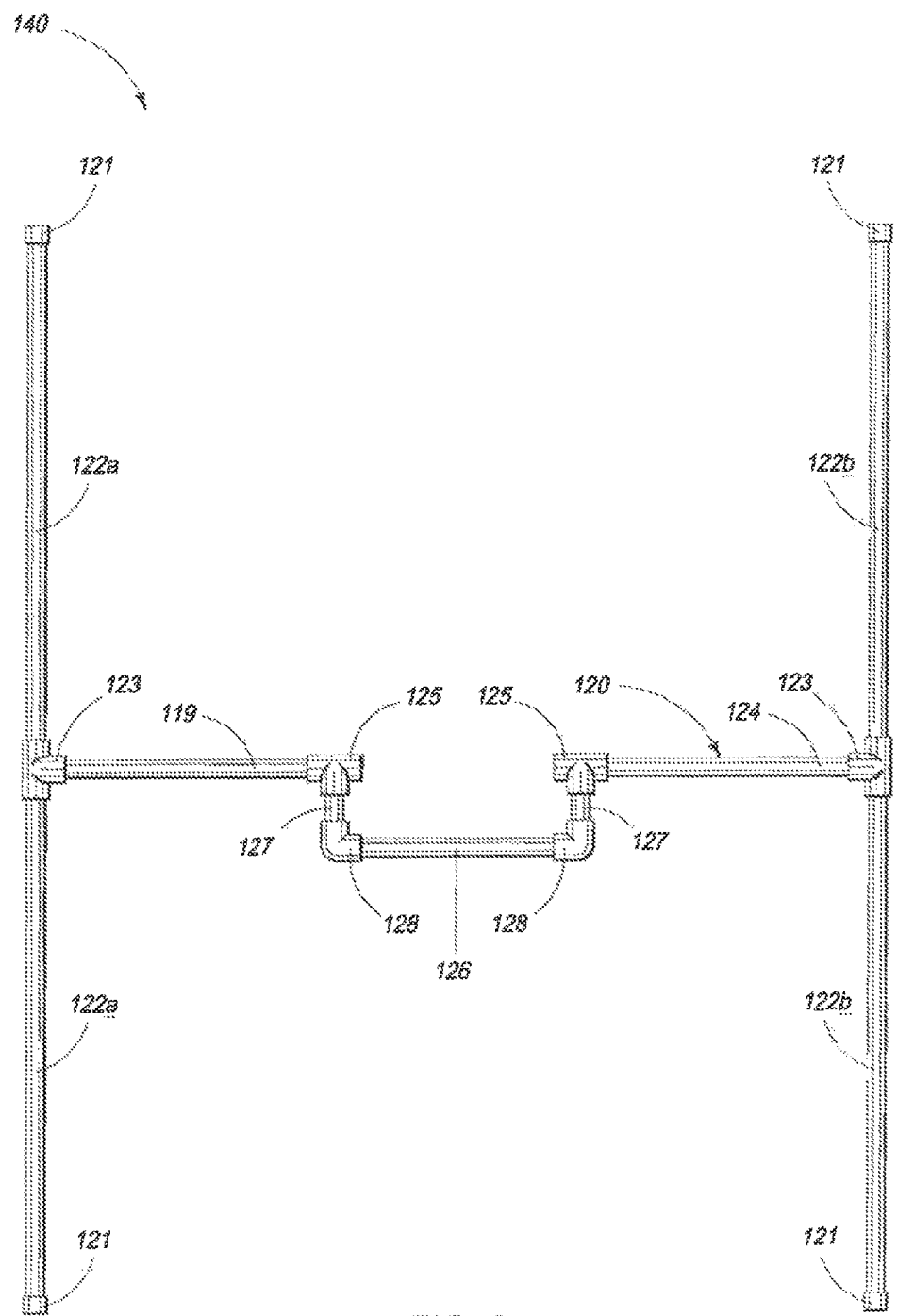
FIG. 6 is a top view of an example of an embodiment of a framework that may be utilized in aspects of this invention.

FIG. 6 is a top view of an example of an embodiment of a framework 140 that may be utilized in aspects of embodiments of this invention, illustrating support bars 122 (shown as first support bar 122a and second support bar 122b), connecting bars 119 & 124 pivotally connected to supporting bars 122 via framework joints 123, end caps 121, center framework component 126 of framework 140 operably connected by adapter portions 128 with center portion connector bars 127 operably connected to adapter portions 125 which are pivotally connected to connector members 124.

It should be noted that while figures such as FIG. 6 generally show an H-shaped framework configuration, no one particular shape or configuration is required to practice this invention. In preferred embodiments of this invention that the framework provides sufficient support and both halves of the insulating blanket, or in all four quadrants of the insulating blanket, to minimize the stress on the insulating blanket during lifting. However if the internal shape of the spa, hot tub or soaking tub is circular, rectangular, heart-shaped or otherwise, the preferred framework configuration may be different, all within the contemplation of this invention.

Figure 7:
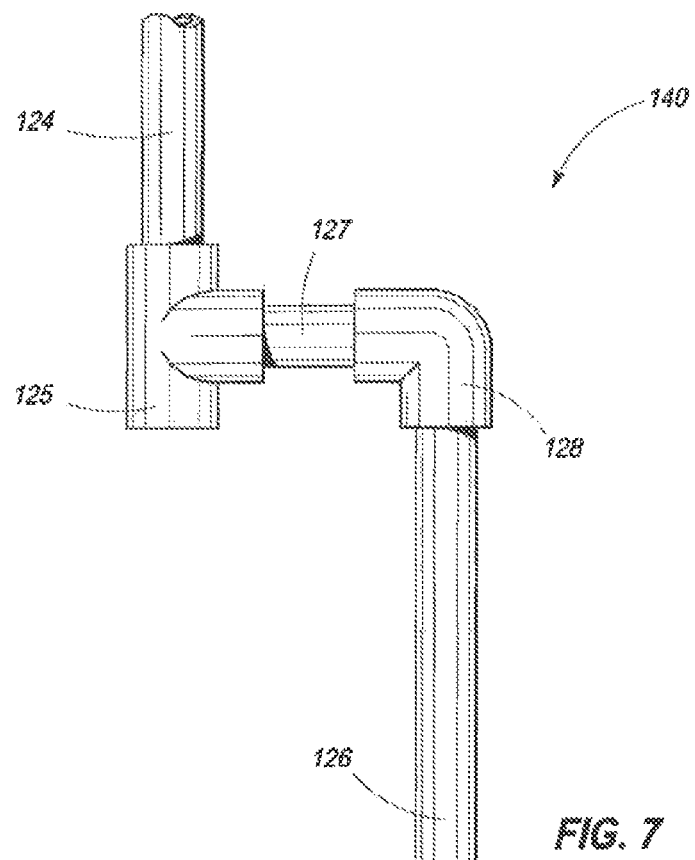
FIG. 7 is a partial top view of the center portion of the framework illustrated in FIG. 6.

FIG. 7 is a partial top view of the example of the embodiment of the center portion 126 of the framework 140 illustrated in FIG. 6, illustrating center framework component 126, center portion connector bars 127 operably connected to adapter portions 125 which are pivotally connected on one end to center portion connector bars 127, and connected on the other end to connector member 124. It should be noted that in some aspects of embodiments of this invention the framework components or portions may pivot with respect to other framework components via a flexible center portion connector bar, all within the contemplation of this invention.

Figure 8:
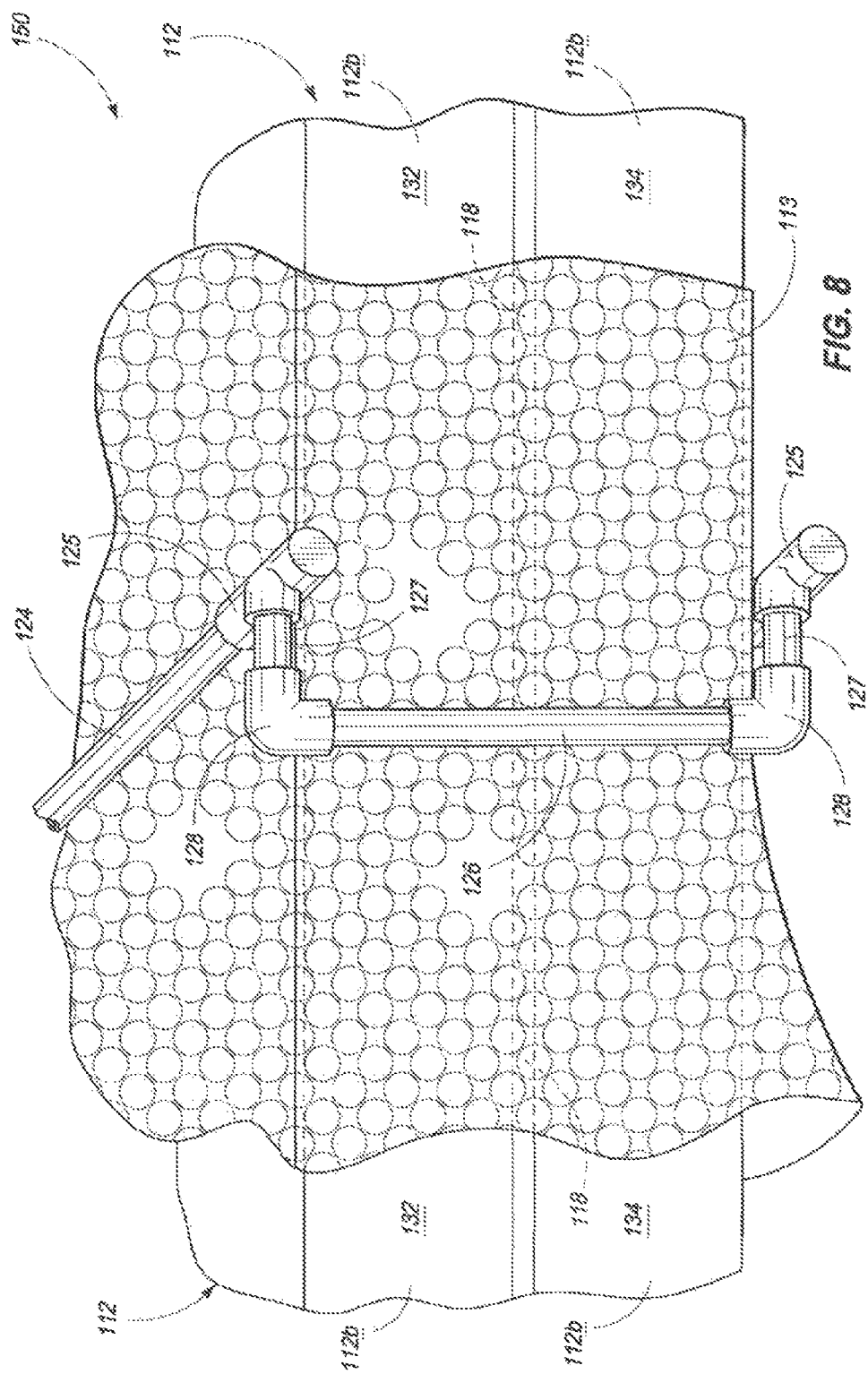
FIG. 8 is a partial elevation perspective view of an example of an embodiment of this invention wherein the hot tub cover is in the one-half open position as shown in FIG. 5D, and wherein the center portion of the framework has positioned the framework relative to the hot tub cover as shown.

FIG. 8 is a partial elevation perspective view of an example of an embodiment of this invention 150 wherein the first side 132 and second side 134 of the hot tub cover place the hot tub cover in the one-half open position as shown in FIG. 5D. FIG. 8 illustrates that the first side 132 is folded over on top of the second side 134 exposing half the hot tub for use. FIG. 8 further illustrates that the center framework component 126 has positioned the framework relative to the hot tub cover such that connector members 119 & 124 (119 is shown in other figures) have been pivoted relative to the center framework component 126 such that the insulating blanket wraps around the hot tub cover with the framework.

Figure 9:
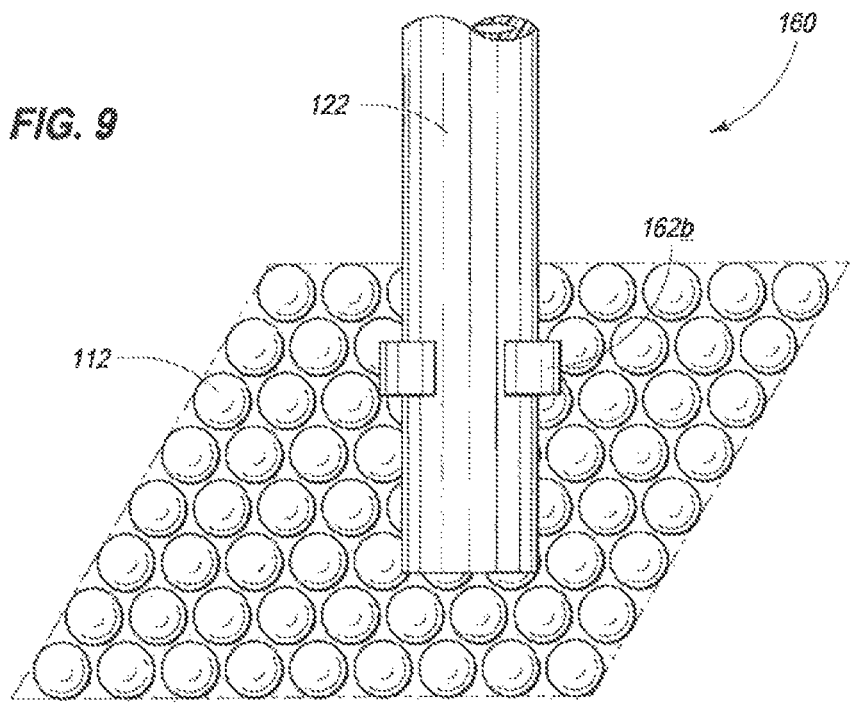
FIG. 9 is a bottom view detail of an example of a portion of the framework operably attached to the insulation blanket.

FIG. 9 is a partial bottom view detail of an example of a portion of the framework, namely the support bars 122, operably attached to the insulating blanket 112 by insulating blanket adapter 162. Insulating blanket adapter 162 includes two parts designed to surround and engage portions of the framework, such as support bars 122 on one side of the insulating blanket 112, and also to provide an upper adapter portion 162a to engage or provide an engagement component for a connector or strap which is connected to a first end to the insulating blanket adapter 162, and at the other end to the portion of the bottom of the hot tub cover under which it is located. This is more fully shown in other figures such as FIGS. 10 & 12.

Figure 9A:
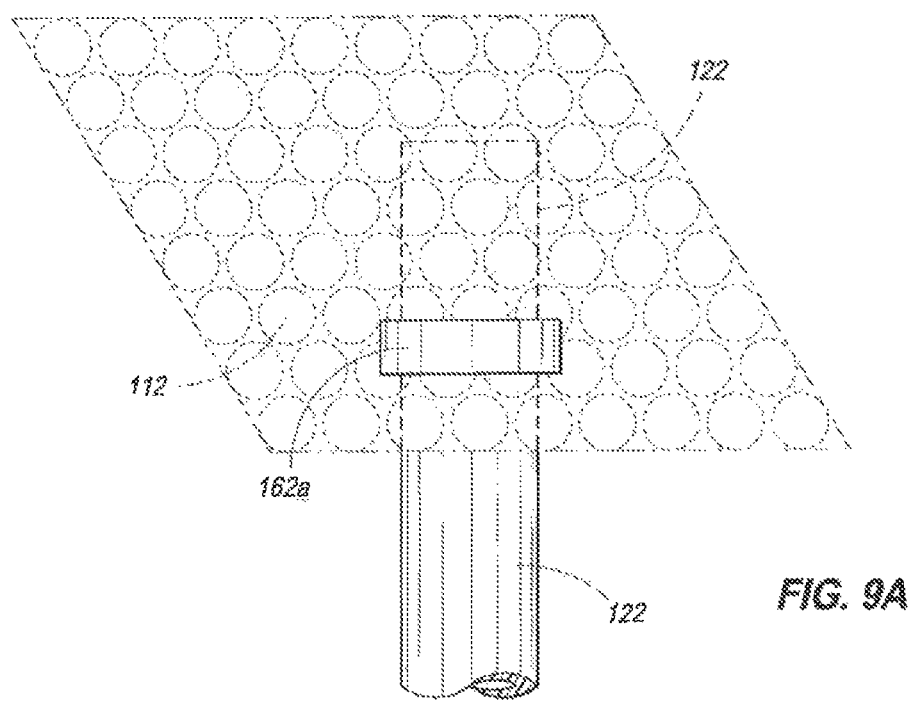
FIG. 9A is a top view detail of an example of a portion of the framework operably attached to the insulation blanket.

FIG. 9A is a partial top view detail of an example of a portion of the framework illustrated in FIG. 9, with like numbers referring to the same parts.

FIG. 10 is a perspective view of a connector or strap 172 which may be utilized in embodiments of this invention to operably connect or attach the insulating blanket adapter 162 to the hot tub cover. The connector strap 172 includes a means or way to fasten it to the bottom of the hot tub cover, which in this example includes washer 176, lock nut 178 and screw 174. The screw 174 would be inserted through an aperture in the strap 172, through washer 176 and through lock washer 178, and then screwed or fastened into the bottom of the hot tub cover. The ends of the connector strap 172 have corresponding hook and loop sections which can then be inserted through the aperture in the closed loop side 162a of adapter 162 to secure the insulating blanket 112 relative to the hot tub cover so that when the hot tub cover is lifted, the insulating blanket is lifted with it. The support bars of the framework would be attached to the open side 162b (shown in FIG. 11) of insulating blanket adapter 162 (underneath the insulating blanket) so that when lifted, the support bar portion of the framework would provide sufficient surface area on one side of the insulating blanket to allow it to be lifted off the water line. Preferably the support bars of the framework would provide lifting support in all four quadrants of the insulating blanket.

FIG. 11 is a perspective view of an example of an insulating blanket adapter 162 which may be utilized in embodiments of this invention to attach an insulating blanket to the hot tub cover. The first component of the insulating blanket adapter 162a provides a loop or point to connect the strap 172, while the open portion of the insulating blanket adapter is utilized to operatively attach to a corresponding portion of the framework (typically located below the insulating blanket).

FIG. 12 is an elevation perspective view of an example of an embodiment of this invention wherein the connector strap 172 illustrated in FIG. 10 is attached at one end to the first side 132 of the hot tub cover and at a second end to the insulating blanket adapter 162 to operably connect or attach the framework which supports the insulating blanket 112 to the first side 132 of the hot tub cover. Like numbered items in FIG. 12 from prior figures will not be repeated here.

FIG. 13 is a top view of another example of an embodiment of the invention 200, wherein the insulating blanket 212 is attached to both the first side 202 and the second side 204 of the hot tub cover 214. FIG. 13 illustrates first side 202 of hot tub cover, second side 204 of hot tub cover, hot tub cover lifting device 208, insulating blanket 212, and four hot tub cover attachment members 220, 222, 224 and 226. The hot tub attachment members are shown in more detail by example of hot tub attachment member 222 in FIGS. 14-16 below.

FIG. 13 further illustrates the first quadrant 233 and second quadrant 234 of the hot tub cover corresponding to the first side 202 of the hot tub cover, and the third quadrant 231 and fourth quadrant 232 corresponding to the second side 204 of hot tub cover. These quadrants of the hot tub cover may correspond to quadrants of the insulating blanket positioned below the hot tub cover. Item 235 may be the pivot axis 235 of the hot tub cover.

FIG. 14 is a perspective exploded view of a hot tub attachment member 222 which provides a point or location of attachment for attaching an insulating blanket to the hot tub cover. FIG. 14 illustrates the hot tub attachment member 222 as a two-piece component which screws or fastens together in a way to surround, sandwich and/or pinch the hot tub cover between the first piece 222a and the second piece 222b of the attachment member. The middle portion 244 of the hot tub cover attachment member 222 extends through the hot tub cover, as shown in later figures. The second piece 222b of hot tub attachment member includes external threads 246a which correspond and screw into internal threads 246b of the top or first piece 222a member of the hot tub attachment member 222.

FIG. 14 further illustrates insulating blanket attachment apertures 250 through which straps, ties and other means may be inserted to make the attachment between the hot tub attachment member 222 and an adapter support for an insulating blanket that is being attached to the hot tub cover (as shown more fully in later figures below).

FIG. 15 is a perspective view of the hot tub attachment member 222 illustrated in FIG. 14 with the two pieces of the hot tub attachment member 222 shown fastened or screwed together. It will be appreciated by those of ordinary skill in the art that while a screw fastening is utilized in this example of the embodiment of the invention, this invention is not limited to any particular method of attaching the two pieces of the hot tub attachment member 222 together around the hot tub cover. Like numbered items from FIG. 14 will not be further discussed or repeated here to avoid repetition.

FIG. 16 is a cross-section view 16-16 from FIG. 15, further illustrating how the two pieces of the hot tub attachment member 222 screwed together and in doing so would become secured to a hot tub cover under which the two pieces are screwed or fastened. Like numbered items from FIG. 14 will not be further discussed repeated to avoid repetition.

FIG. 17 is an elevation view of another example of an embodiment of this invention wherein four hot tub attachment members 220, 222, 224 & 226 (some shown only in FIG. 19) as illustrated in FIGS. 14-16 are utilized to connect the insulating blanket 112 to the first side 202 and second side 204 of the hot tub cover. FIG. 17 shows hot tub attachment member 226 attached to the first side 202 of hot tub cover and hot tub attachment member 222 attached to the second side 204 of hot tub cover. FIG. 17 illustrates the hot tub cover in a flat position on the hot tub with the insulating blanket 112 floating on the water line.

FIG. 17 also illustrates the use of a surface area support system for the insulating blanket 112. It will be appreciated that in order to lift the insulating blanket 112 off the surface of the water and overcome the weight of the insulating blanket 112 and the water surface tension, some force is needed. Typical insulating blankets may not withstand the force needed to lift the blanket if the lifting is accomplished at a specific point verses over a certain minimum surface area. Depending on a lot of different factors, the lifting of the hot tub cover could over time tear the insulating blanket at the point of attachment if there is not sufficient surface area supporting the lifting. The different factors that may affect possible tearing may include the speed and suddenness that the hot tub cover is lifted, the weight of the insulating blanket 112, the surface tension between the insulating blanket 112 and the water in the hot tub, the specific area that the lifting support device affects the insulating blanket 112.

In this view and as illustrated in FIG. 17, the hot tub attachment members include insulating blanket lift supports 226c and 222c.

FIG. 17 illustrates how insulating blanket lift support 226c is positioned beneath the insulating blanket and attached to the hot tub attachment member 226 via connector straps 242. One example of the connector strap that may be used are commonly referred to as zip ties so that the buckle portion may be placed beneath the insulating blanket lift supports 222c and 226c and extend up to and into the bottom portion of the hot tub attachment members 222 and 226. The insulating blanket attachment apertures 250 illustrated in FIGS. 14-16 may be compatible recipients of the zip ties and configured to receive and lock them into place. Ideally the length of the zip tie can be adjusted so that the insulating blanket 112 rest on the water line or surface of the water when the hot tub cover is fully covering the hot tub.

The insulating blanket lift supports 222c and 226c are preferably of a minimum surface area or size relative to the insulating blanket to provide and adequately large support to avoid tears and undesirable pressures on the insulating blanket, the specific size of which will depend on several factors such as the weight of the insulating blanket, the strength of the insulating blanket, and others.

It will be appreciated that there are any one of a number of other ways to attach the hot tub attachment members to the insulating blanket lift supports, such as by rigid members, flexible members, hook and loop configuration such as sold under the Velcro brand, and others, all within the contemplation of different embodiments of this invention and with no one in particular being required to practice this aspect of the invention.

FIG. 18 is an elevation view of the example of the embodiment of the invention illustrated in FIG. 17, wherein the first side 202 of the hot tub cover is partially rotated or pivoted relative to the second side 204 of the hot tub cover. Like numbered figures from FIG. 17 apply equally to FIG. 18 will not be repeated herein. FIG. 18 does show an exploded view of a hot tub cover attachment member and an illustration of one possible type of connector strap, namely a zip lock type of articulated tie 242. If a zip tie is used, the apertures in the attachment member (items 250 in FIG. 16) can be corresponding apertures to support and provide the typical zip tie locking and adjustability features.

Figure 19:
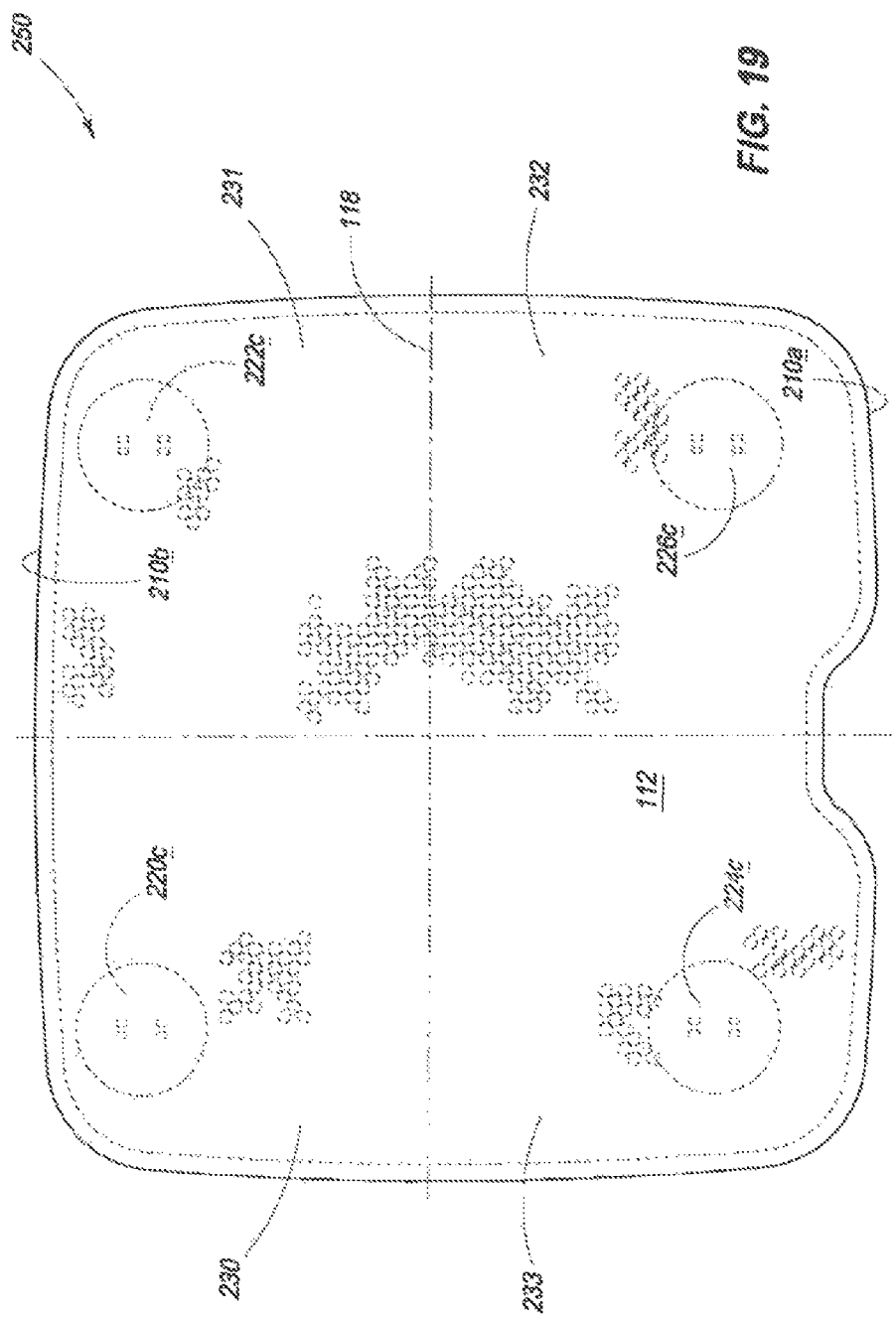
FIG. 19 is a top view of an insulating blanket with the insulating blanket supports shown.

FIG. 19 is a top view of an example of part of an embodiment of the invention 250, illustrating insulating blanket 112 (with first side 210*a* and second side 210*b*) with the insulating blanket lift supports 220*c*, 222*c*, 224*c* & 226*c* shown. It should be noted how increasing the surface area by utilizing the lift supports better support the lifting effort and may reduce wear, tear and failure of the insulating blanket 112 when being lifted. It is preferred to have lifting support such as through insulating blanket lift supports or through a sufficient framework beneath the insulating blanket 112, in all four quadrants 230, 231, 232 and 233, or sections, of the insulating blanket so that there is not an undue or undesired amount of stress placed on any one point of lifting when lifting the hot tub cover and consequently lifting the insulating blanket off the surface of the water.

The movement of the insulating blanket relative to the hot tub cover for the embodiment of the invention illustrated in FIG. 12 and also in FIGS. 13-19, would be the same as that shown in FIGS. 5-5F, as would be appreciated by those of ordinary skill in the art.

Figure 20:
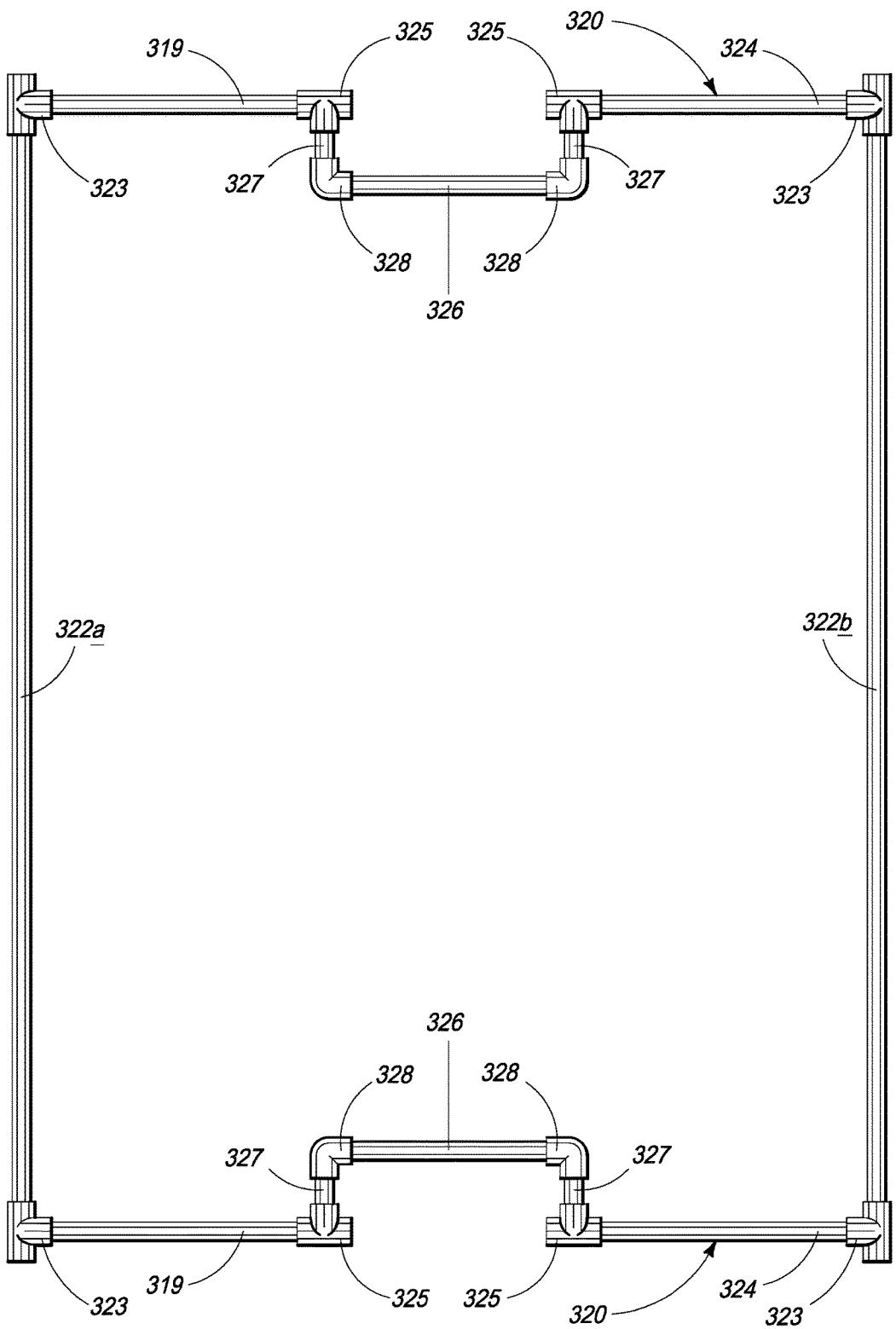
FIG. 20 is a top view of another example of an embodiment of this invention.

FIG. 20 is a top view of another example of a framework support members 322*a* and 322*b*, framework connecting members 319, 324 and 326, framework pivot members 327 which provide two pivot axis (a line through the center of opposing framework pivot member 327) about which the framework can pivot. The location of the pivot member 327 corresponds to the thickness of the first side and second side of the hot tub cover (shown for example in FIGS. 5D & 5E). The elbows 328 and T-joints 325 facilitate the rotation or pivoting of the framework along the two pivot axis through framework pivot member 327.

As will be appreciated by those of reasonable skill in the art, there are numerous embodiments to this invention, and variations of elements and components which may be used, all within the scope of this invention. In one embodiment for example a hot tub insulating blanket system may be provided which is configured for use in combination with a hot tub cover having a first side and a second side, wherein the first side and second side pivot relative to each other along a pivot axis, the insulating blanket system comprising: an insulating blanket configured to cover exposed water in the hot tub, the insulating blanket having a first quadrant, a second quadrant, a third quadrant and a fourth quadrant; and a framework configured to attach to and provide lifting support for at least two quadrants of the insulating blanket.

Further and additional embodiments to that described in the preceding paragraph may be a hot tub insulating blanket system: and further wherein the framework is comprised of: a first framework support bar configured to operably attach to each of the first quadrant and second quadrant of the insulating blanket, and second support bar configured to operably attach to the third quadrant and the fourth quadrant of the insulating blanket; and still further wherein the framework further comprises framework connecting members connected on a first side to the first framework support bar and connected on a second side to the second framework support bar, and further wherein the framework connecting members include two pivot joints corresponding to a width of the first side and second side of the hot tub cover when folded; and/or wherein the framework is comprised of the hot tub cover and the insulating blanket lift supports operably attached thereto.

In addition to the embodiments disclosed above, embodiments of the invention may further include a hot tub insulating system comprising: a hot tub cover having a first side and a second side which pivot relative to each other along a pivot axis; an insulating blanket configured to float upon a water surface within the hot tub; a first side insulating blanket lift support positioned under the insulating blanket under the first side of the hot tub cover, and a second side insulating blanket lift support positioned under the insulating blanket under the second side of the hot tub cover, the first side and second side insulating blanket lift supports being operably connected to the first side and second side of the hot tub cover respectively; and such that when the first side of the hot tub cover is pivoted relative to the second side of the hot tub cover, the insulating blanket folds with and around the hot tub cover.

Further and additional embodiments to that described in the preceding paragraph may be a hot tub insulating system as recited in the preceding paragraph, and further wherein the hot tub cover has a first quadrant and a second quadrant on the first side and a third quadrant and a fourth quadrant on the second side, and the insulating blanket has a first quadrant and a second quadrant corresponding to the first side of the hot tub cover and a third quadrant and a fourth quadrant corresponding to the second side of the hot tub cover, and further comprising: a first insulating blanket lift support disposed under the first quadrant of the insulating blank, the lift support being operably attached to the first quadrant of the hot tub cover; a second insulating blanket lift support disposed under the second quadrant of the insulating blank, the lift support being operably attached to the second quadrant of the hot tub cover; a third insulating blanket lift support disposed under the third quadrant of the insulating blank, the lift support being operably attached to the third quadrant of the hot tub cover; and a fourth insulating blanket lift support disposed under the fourth quadrant of the insulating blank, the lift support being operably attached to the fourth quadrant of the hot tub cover.

Still further embodiments to that hot tub insulating system described in the preceding paragraph may be: further wherein the first, second, third and fourth insulating blanket lift supports are operably attached to their respective quadrants of the hot tub cover by adjustable length connectors; further wherein the first, second, third and fourth insulating blanket lift supports are operably attached to their respective quadrants of the hot tub cover by flexible connectors; and/or further wherein the first, second, third and fourth insulating blanket lift supports are operably attached to their respective quadrants of the hot tub cover by straps.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A hot tub insulating blanket system configured for use in combination with a hot tub cover having a first side and a second side, wherein the first side and second side pivot relative to each other along a pivot axis, the insulating blanket system comprising:

an insulating blanket configured to cover exposed water in the hot tub, the insulating blanket being positioned between the hot tub cover and the exposed water, the insulating blanket having a first quadrant, a second quadrant, a third quadrant and a fourth quadrant;

a framework configured to attach to and provide lifting support for at least two quadrants of the insulating blanket; and further wherein the framework is comprised of: a first framework support bar configured to operably attach to each of the first quadrant and second quadrant of the insulating blanket, and second support bar configured to operably attach to the third quadrant and the fourth quadrant of the insulating blanket.

2. A hot tub insulating blanket system as recited in claim 1, and further wherein the framework further comprises framework connecting members connected on a first side to the first framework support bar and connected on a second side to the second framework support bar, and further wherein the framework connecting members include two pivot joints corresponding to a width of the first side and second side of the hot tub cover when folded.

3. A hot tub insulating blanket system as recited in claim 1, and further wherein the framework is comprised of the hot tub cover and the insulating blanket lift supports operably attached thereto.

4. A hot tub insulating system comprising:
a hot tub cover having a first side and a second side which pivot relative to each other along a pivot axis;
an insulating blanket configured to float upon a water surface within the hot tub;
a first side insulating blanket lift support positioned under the insulating blanket under the first side of the hot tub cover, and a second side insulating blanket lift support positioned under the insulating blanket under the second side of the hot tub cover, the first side and second side insulating blanket lift supports being operably connected to the first side and second side of the hot tub cover respectively; and
such that when the first side of the hot tub cover is pivoted relative to the second side of the hot tub cover, the insulating blanket folds with and around the hot tub cover.

5. A hot tub insulating system as recited in claim 4, and further wherein the hot tub cover has a first quadrant and a second quadrant on the first side and a third quadrant and a fourth quadrant on the second side, and the insulating blanket has a first quadrant and a second quadrant corresponding to the first side of the hot tub cover and a third quadrant and a fourth quadrant corresponding to the second side of the hot tub cover, and further comprising:
a first insulating blanket lift support disposed under the first quadrant of the insulating blanket, the lift support being operably attached to the first quadrant of the hot tub cover;
a second insulating blanket lift support disposed under the second quadrant of the insulating blanket, the lift support being operably attached to the second quadrant of the hot tub cover;
a third insulating blanket lift support disposed under the third quadrant of the insulating blanket, the lift support being operably attached to the third quadrant of the hot tub cover; and
a fourth insulating blanket lift support disposed under the fourth quadrant of the insulating blanket, the lift support being operably attached to the fourth quadrant of the hot tub cover.

6. A hot tub insulating system as recited in claim 5, and further wherein the first, second, third and fourth insulating blanket lift supports are operably attached to their respective quadrants of the hot tub cover by adjustable length connectors.

7. A hot tub insulating system as recited in claim 5, and further wherein the first, second, third and fourth insulating blanket lift supports are operably attached to their respective quadrants of the hot tub cover by flexible connectors.

8. A hot tub insulating system as recited in claim 7, and further wherein the first, second, third and fourth insulating blanket lift supports are operably attached to their respective quadrants of the hot tub cover by straps.

* * * * *